(12) United States Patent
Norell et al.

(10) Patent No.: US 7,095,150 B2
(45) Date of Patent: Aug. 22, 2006

(54) APPARATUS FOR SECURING A BOBBIN OF A RELUCTANCE MACHINE

(75) Inventors: Neil N. Norell, Endicott, NY (US); Mark E. Baer, Trout Run, PA (US)

(73) Assignee: Shop Vac Corporation, Williamsport, PA (US)

( * ) Notice: Subject to any disclaimer, the term of this patent is extended or adjusted under 35 U.S.C. 154(b) by 0 days.

(21) Appl. No.: 10/970,293

(22) Filed: Oct. 21, 2004

(65) Prior Publication Data
US 2006/0087192 A1 Apr. 27, 2006

(51) Int. Cl.
*H02K 5/00* (2006.01)
*H02K 5/04* (2006.01)
*H02K 11/00* (2006.01)

(52) U.S. Cl. .......................... 310/194; 310/91; 310/71

(58) Field of Classification Search ................ 310/194, 310/89, 91, 71, 254, 258
See application file for complete search history.

(56) References Cited

U.S. PATENT DOCUMENTS

| | | | |
|---|---|---|---|
| 4,977,344 A | 12/1990 | Obradovic | |
| 5,239,217 A | 8/1993 | Horst | |
| 5,294,856 A | 3/1994 | Horst | |
| 5,717,269 A | 2/1998 | Tang | |
| 5,719,456 A | 2/1998 | Kolomeitsev | |
| 5,767,596 A * | 6/1998 | Stark et al. .................... 310/89 |
| 5,780,945 A | 7/1998 | Caviglia et al. | |
| 5,844,343 A | 12/1998 | Horst | |
| 5,889,347 A | 3/1999 | Tang et al. | |
| 5,936,373 A | 8/1999 | Li et al. | |
| 5,939,807 A | 8/1999 | Patyk et al. | |
| 5,969,454 A | 10/1999 | Pengov et al. | |
| 6,005,321 A | 12/1999 | Bolton et al. | |
| 6,025,385 A | 2/2000 | Pengov et al. | |

(Continued)

FOREIGN PATENT DOCUMENTS

CA 2151532 12/1998

(Continued)

OTHER PUBLICATIONS

Pelikant et al., "The Influence of the Rotor Pole Shape on the Static and Dynamic Characteristics of the Switched Reluctance Motor," IEEE Transactions on Magnetics, 32(3):1529-1532 (May 1996).

(Continued)

*Primary Examiner*—Tran Nguyen
(74) *Attorney, Agent, or Firm*—Marshall, Gerstein & Borun LLP

(57) ABSTRACT

A switched reluctance machine includes a stator body having a stator pole. A bobbin is located on the stator pole. A stator winding is disposed on the bobbin. The switched reluctance machine further includes a first housing unit for receiving the stator body and an insulating member coupled to the first housing unit. The insulating member includes a first mounting element for engaging a first end of the bobbin to secure the bobbin against displacement during machine operation.

56 Claims, 30 Drawing Sheets

U.S. PATENT DOCUMENTS

| | | | |
|---|---|---|---|
| 6,028,668 A | 2/2000 | Kolomeitsev | |
| 6,054,819 A | 4/2000 | Pengov | |
| 6,072,260 A | 6/2000 | Randall | |
| 6,093,993 A | 7/2000 | McClelland | |
| 6,232,693 B1 | 5/2001 | Gierer et al. | |
| 6,555,942 B1 * | 4/2003 | Hsu | 310/208 |
| 6,573,632 B1 * | 6/2003 | Hsu | 310/216 |
| 6,809,445 B1 * | 10/2004 | Reddy | 310/89 |
| 2004/0051417 A1 | 3/2004 | Yamazaki et al. | |
| 2004/0056548 A1 | 3/2004 | Tanaka et al. | |
| 2004/0160140 A1 | 8/2004 | Shoykhet | |

FOREIGN PATENT DOCUMENTS

| | | |
|---|---|---|
| DE | 202 04 507 U 1 | 6/2002 |
| EP | 0 605 247 A2 | 7/1994 |
| GB | 2 362 268 | 11/2001 |

OTHER PUBLICATIONS

Moallem et al., Effect of Rotor Profiles on the Torque of a Switched Reluctance Motor, Conference 1990 IEEE Industry Applications Society Annual Meeting, IEEE Catalog No. 90CH2935-5, pp. 247-253, (Oct. 1990).

International Search Report for PCT/US2005/026003 dated Oct. 28, 2005.

Written Opinion for PCT/US2005/026003 dated Oct. 28, 2005.

* cited by examiner

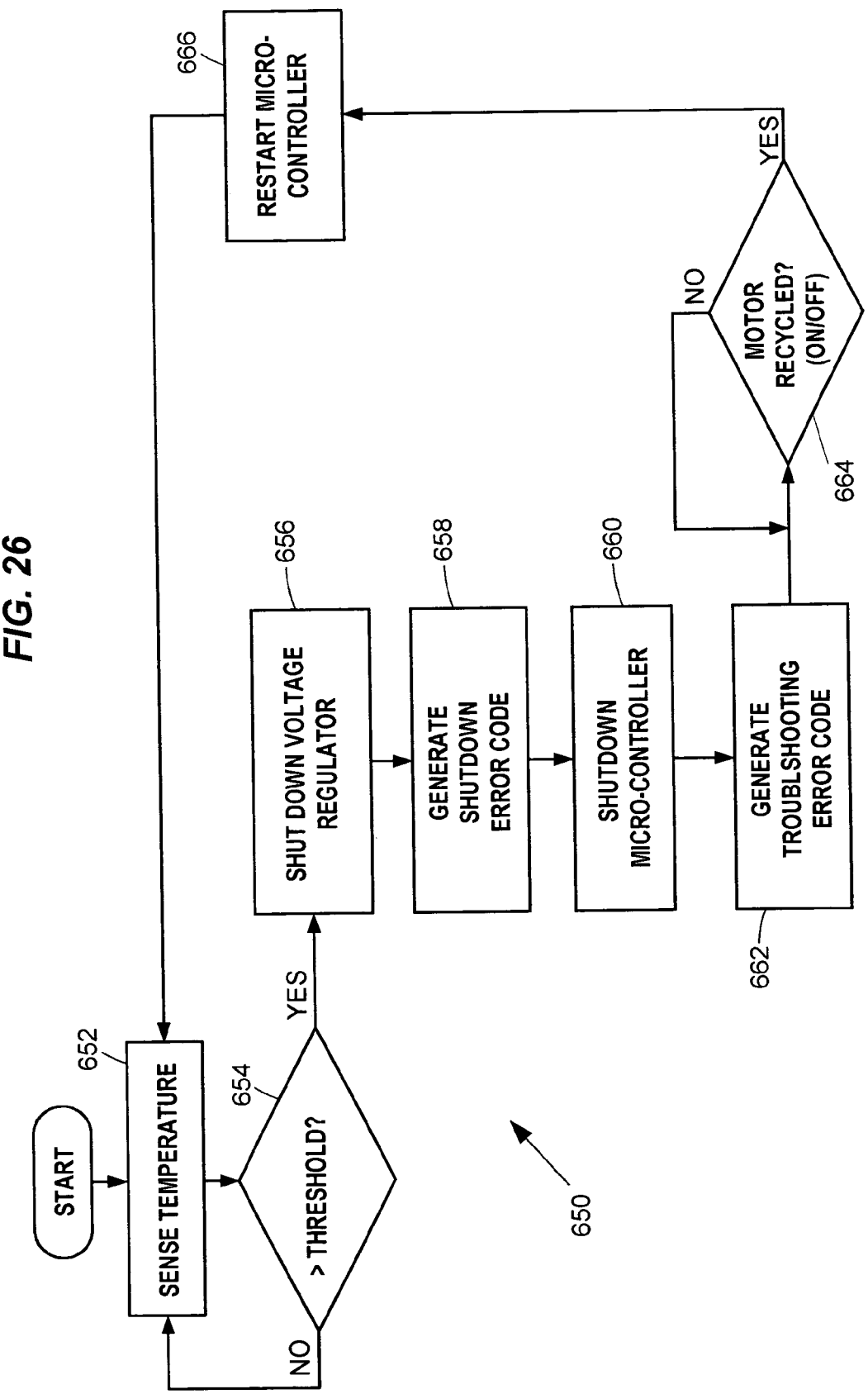

APPARATUS FOR SECURING A BOBBIN OF A RELUCTANCE MACHINE

TECHNICAL FIELD

The present disclosure relates generally to a reluctance machine and, more particularly, to an apparatus for securing a bobbin of the reluctance machine against displacement during machine operation.

BACKGROUND

A switched reluctance motor is an electrical motor that includes a rotor and a stator. Torque in a reluctance motor is produced by the tendency of the rotor to move to a position relative to the stator in which the reluctance of a magnetic circuit is minimized, i.e. a position in which the inductance of an energized stator winding is maximized. In a switched reluctance motor, circuitry is provided for detecting the angular position of the rotor and sequentially energizing phases of the stator windings as a function of rotor position.

Switched reluctance motors are doubly salient motors having poles on both the stator and the rotor, with windings only on the stator poles. The rotor of a switched reluctance motor does not include commutators, permanent magnets, or windings. A switched reluctance motor may be used in a vacuum cleaner, for example.

Torque may be produced by energizing or applying current to the stator windings of the stator poles associated with a particular phase in a predetermined sequence. The energization of the stator windings is typically synchronized with the rotational position of the rotor. A magnetic force of attraction results between the poles of the rotor and the energized stator poles associated with a particular phase, thereby causing the rotor poles to move into alignment with the energized stator poles.

In typical operation, each time a stator winding of the switched reluctance motor is energized, magnetic flux flows from the energized stator poles associated with a particular phase, across an air gap located between the stator poles and the rotor poles, and to the rotor poles. Magnetic flux generated across the air gap between the rotor poles and the stator poles produces a magnetic field in the air gap that causes the rotor poles to move into alignment with the energized stator poles associated with a particular phase, thereby producing torque. The amount of magnetic flux and, therefore, the amount of torque generated by the switched reluctance motor is dependent upon many variables such as, for example, the magnetic properties of the material of the rotor poles and the stator poles, and the length of the air gap between the rotor poles and the stator poles.

The stator windings of the switched reluctance motor may be prewound around a bobbin. The bobbin acts as an insulation barrier between the stator windings and the core of the stator. The prewound bobbin may then be placed over each of the stator poles during motor assembly. Typically, vibrations in the motor structure, variations in motor temperature, and electromotive force (EMF) may cause radial displacement of the bobbin during motor operation, thereby causing undesirable acoustic noise.

BRIEF DESCRIPTION OF THE DRAWINGS

FIG. 26 illustrates a flowchart for operating the brushless motor using the control circuit of FIG. 22;

DETAILED DESCRIPTION

Figure 1:
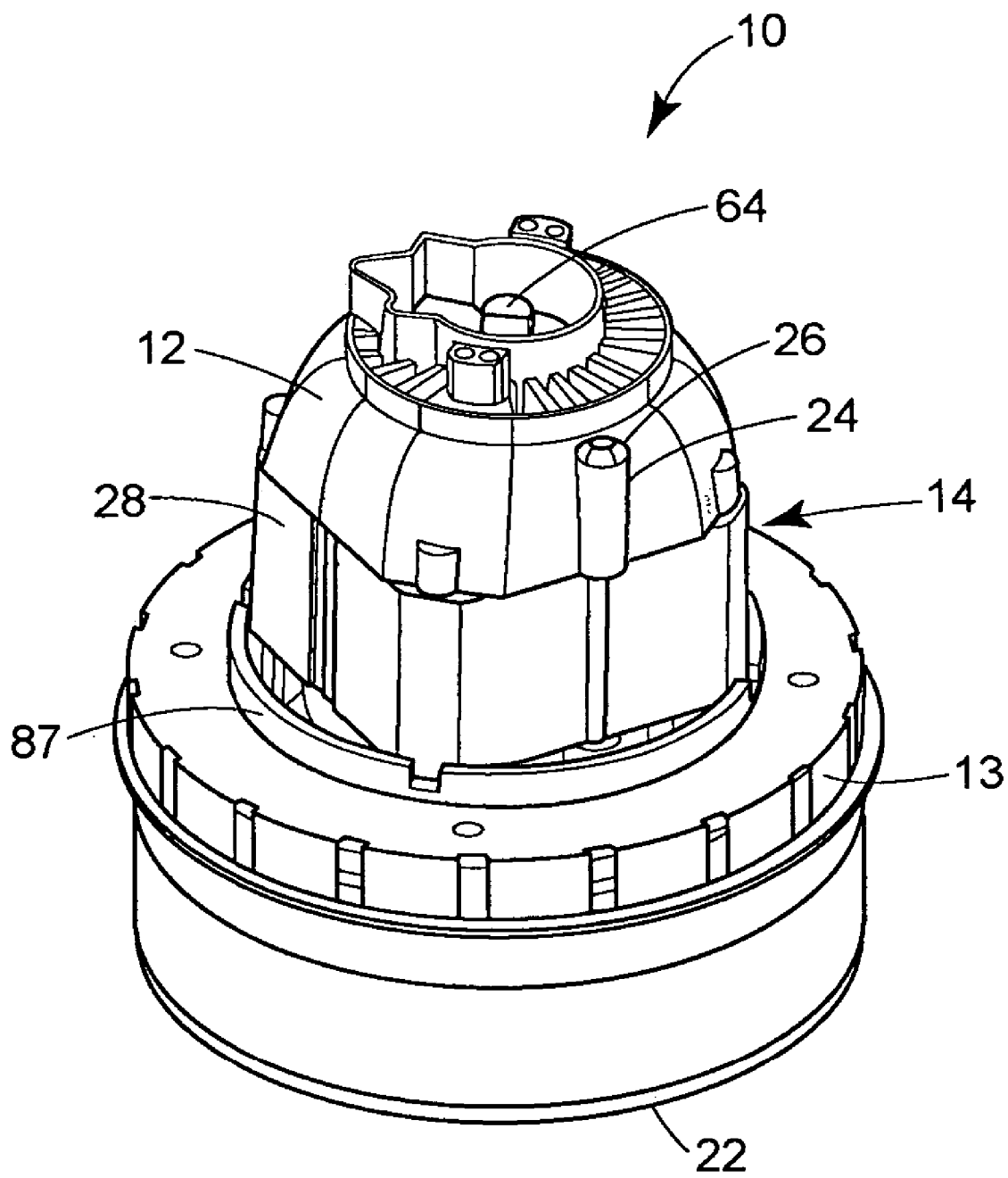
FIG. 1 is a perspective view of a switched reluctance motor, including a stator and a rotor.
Figure 2:
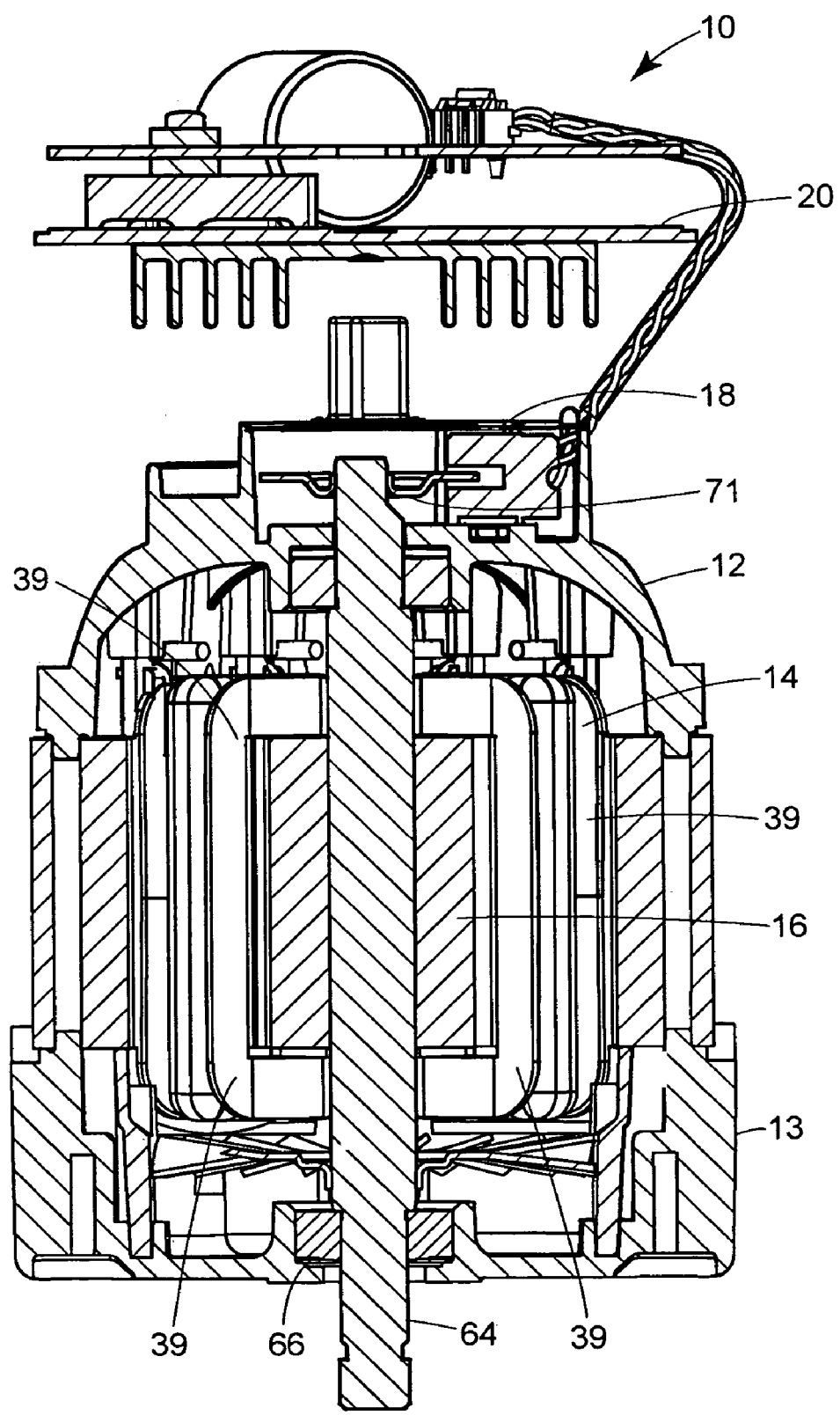
FIG. 2 is a sectional view of the motor shown in FIG. 1.

Referring to FIGS. 1–2, a switched reluctance motor 10 may be constructed as a package or unit of subassemblies, each of which may be separately preassembled and combined together during a manufacturing process. Specifically, the motor 10 may include an upper housing unit 12, a lower housing unit 13, a stator 14, a rotor 16, a drive assembly 18, a first end cap 20, and a second end cap 22. Both the upper housing unit 12 and the lower housing unit 13 may be annular in shape, with the first end cap 20 being coupled to the upper housing unit 12, and the second end cap 22 being coupled to the lower housing unit 13. As shown in FIGS. 1–2, each of the upper housing unit 12, the lower housing unit 13, the stator 14, the rotor 16, the drive assembly 18, the first end cap 20, and the second end cap 22 may be combined into a single package or unit.

The upper housing unit 12 may include a plurality of apertures 24 for receiving a plurality of fasteners 26 to secure the upper housing unit 12 to the stator 14 during assembly. It should be understood, however, that the upper housing unit 12 may be secured to the stator 14 in any other suitable manner such as, for example, by a clamp, a mounting bracket/flange, or the like.

Figure 3:
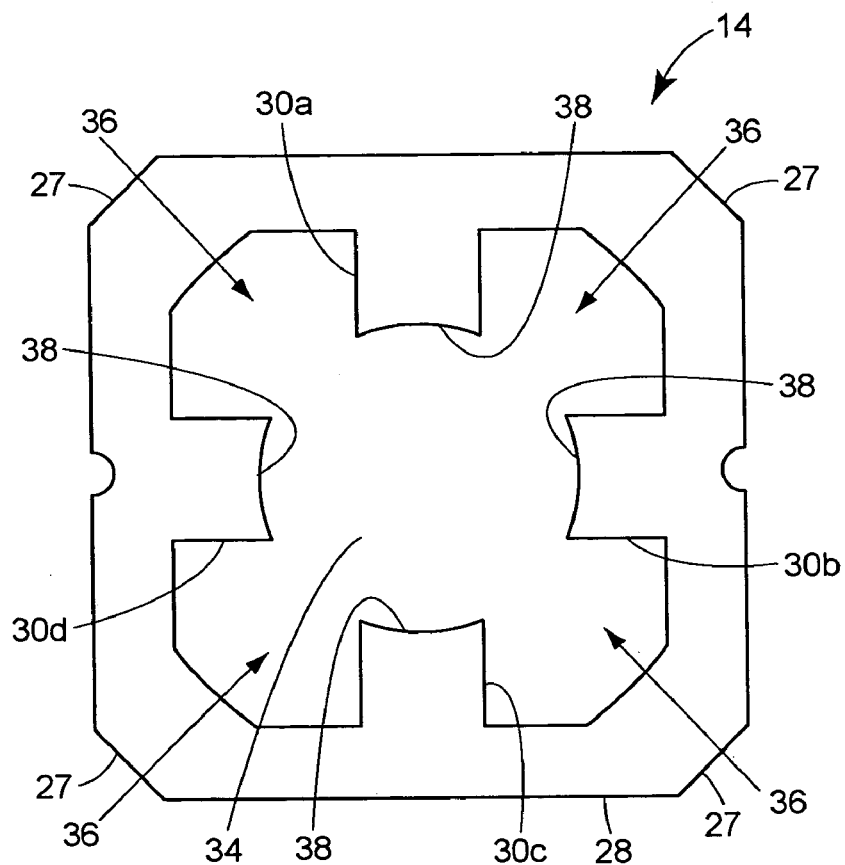
FIG. 3 is a cross-sectional view of a stator core of the motor shown in FIG. 1.

Referring to FIG. 3, the stator 14 may be constructed in a square-type configuration, with slanting or chamfered portions 27 at the four corners of the stator 14. It should be understood, however, that the stator 14 may have other configurations as well such as, for example, a circular configuration, an oval configuration, a rectangular configuration, or the like.

The stator 14 includes a stator core 28, a plurality of equally spaced stator poles 30, and stator windings 32 (FIGS. 7–8 and 10) disposed on the stator core 28. The stator core 28 includes an inner surface that defines a central bore 34. The stator core 28 may be stamped or formed from a plurality of laminated sheets, or laminations, of ferromagnetic material such as, for example, steel. Laminated sheets may be used in the stator core 28 to control eddy currents and, thereby avoid overheating of the stator core 28. The stator laminations may be laminated together in a conventional manner and arranged in a back-to-back configuration.

As shown in FIG. 3, the plurality of equally spaced stator poles 30 is arranged in a circumferential path about the stator core 28. It should be understood that the stator poles 30 and the stator core 28 may be formed as one, integral piece. In the embodiment illustrated in FIG. 3, the stator 14 includes four circumferentially spaced-apart stator poles 30a, 30b, 30c, 30d projecting inwardly from the stator core 28 toward the central bore 34. The stator poles 30a–d may cooperate to define inwardly opening slots 36, each of which receives coils of wire during a stator winding operation. Each of the stator poles 30a–d includes a stator pole face 38 at the end projecting into the central bore 34. The stator pole face 38 may be generally convex in shape.

Figure 4:
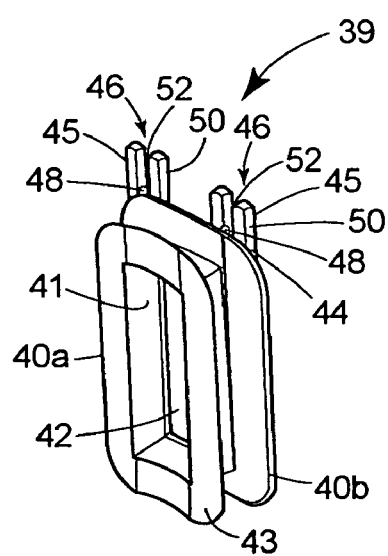
FIG. 4 is a perspective view of one of a plurality of bobbins associated with the stator of the motor shown in FIG. 1, including a plurality of wire retainers located at an upper portion of each of the plurality of bobbins.

The stator windings 32 are conventional and may be, for example, polyester-coated wires or magnetic wires prewound into coils and placed on a bobbin 39 (FIG. 4).

Referring to FIG. 4, the bobbin 39, which may be disposed on each of the stator poles 30, may include a front plate 40a and a back plate 40b that is spaced apart from the front plate 40a. The front plate 40a and the back plate 40b may be connected together by a connecting member 41 to define an opening 42 that extends through the bobbin 39. During a stator winding operation, stator windings 32 may be wound around the connecting member 41 located between the front plate 40a and the back plate 40b of each of the plurality of bobbins 39. The bobbin 39 acts as an insulation barrier between the stator windings 32 and the stator core 28. Each of the prewound bobbins 39, which may include approximately 95 turns of wire per stator pole 30, may then be placed over individual stator poles 30 such that each of the stator poles 30 extends through the opening 42 of the bobbin 39 with the stator pole face 38 being flush with an exterior side 43 of the front plate 40a. As a result, the sides of the front plate 40a and the back plate 40b of each of the plurality of prewound bobbins 39 may extend radially and outwardly into the slots 36 of the stator 14.

Each of the plurality of bobbins 39 may further include wire retainers 44 located at an upper portion of the back plate 40b of each of the plurality of bobbins 39. As shown in FIG. 4, each of the wire retainers 44 may include a prong structure 45 located at opposite sides of the upper, portion of the back plate 40b of each of the plurality of bobbins 39. Each of the prong structures 45 may include a groove 46 for receiving an end 48 of the stator winding 32 disposed on each of the plurality of bobbins 39 during a stator winding operation.

Each of the prong structures 45 may further include an outer portion 50 and an inner portion 52 that is disposed within the outer portion 50. The outer portion 50 may be composed of a nonconductive material such as, for example, plastic. The inner portion 52, which may include the groove 46, may be composed of a conductive material such as, for example, metal. The conductive material of the inner portion 52 serves to provide an electrical connection between the conductive inner portion 52 and the end 48 of the stator winding 38 disposed on each of the plurality of bobbins 39.

Figure 5:
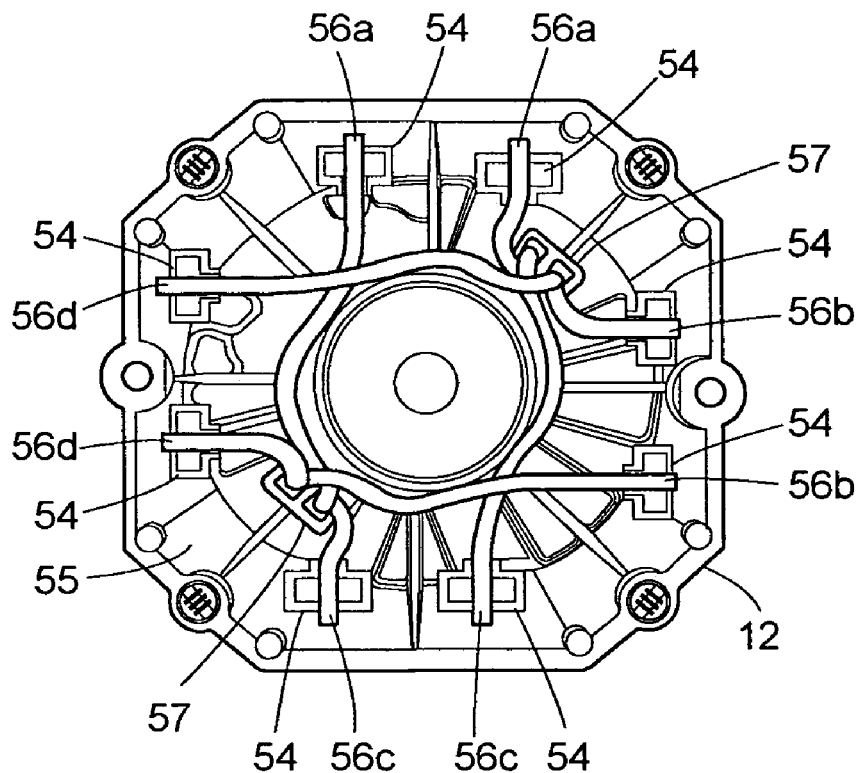
FIG. 5 is a top view of an upper housing unit of the motor, including a second plurality of mounting elements for receiving an upper portion of each of the plurality of bobbins of the stator.

Referring to FIGS. 5–8, the upper housing unit 12 of the motor 10 is shown. The upper housing unit 12 includes a plurality of upper mounting elements 54 disposed in an inner region 55 of the upper housing unit 12. Each of the plurality of upper mounting elements 54 engages an upper portion of a bobbin 39 disposed on a stator pole 30 during assembly. The plurality of upper mounting elements 54 act to secure the upper portion of each of the plurality of bobbins 39 against displacement during motor operation. As shown in FIG. 5, wire leads 56a–d are disposed in each of the plurality of upper mounting elements 54 and electrically connected together via connection terminals 57. More specifically, wire leads 56a are connected to wire leads 56c via connection terminals 57. Likewise wire leads 56b are connected to wire leads 56d via connection terminals 57. As will be discussed in greater detail below, the wire leads 56a–d are connected together in this manner so that when the stator 14 is mounted to the upper housing unit 12 during assembly, the stator windings 32 disposed on the stator poles 30a are electrically connected in parallel with the stator windings 32 disposed on the stator poles 30c. Likewise, when the stator 14 is mounted to the upper housing unit 12 during assembly, the stator windings 32 disposed on the stator poles 30b are electrically connected in parallel with the stator windings 32 disposed on the stator poles 30d.

Figure 6:
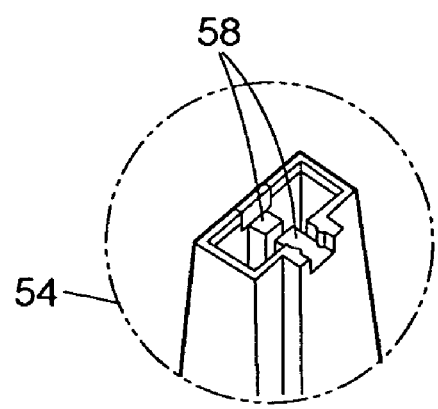
FIG. 6 is an enlarged perspective view of one of the second plurality of mounting elements shown in FIG. 5.

Referring to FIG. 6, an enlarged perspective view of one of the plurality of upper mounting elements 54 is shown. As shown in FIG. 6, each of the wire leads 56 of FIG. 5 is disposed within a conductor anvil 58 of the upper mounting element 54 and securely held in place. Conductor anvils 58 are well known in the art and are, therefore, not discussed further herein.

Figure 7:
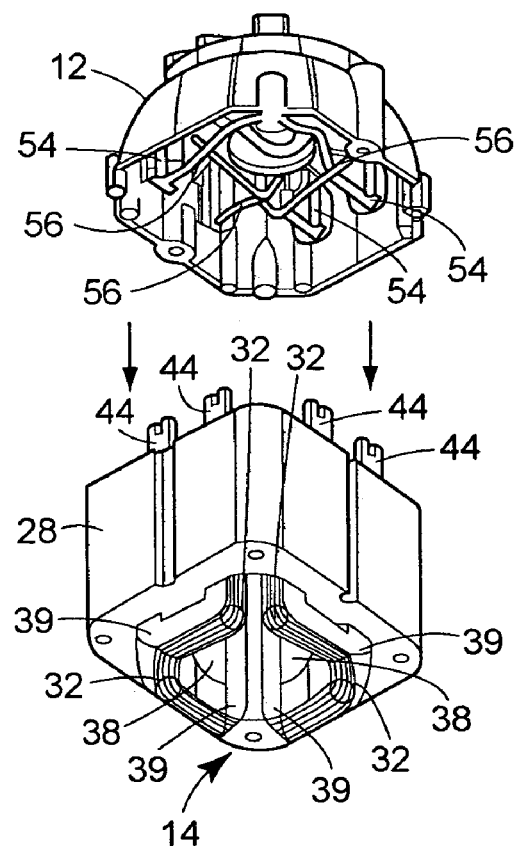
FIG. 7 is an exploded perspective view of the stator and the upper housing unit before assembly.

FIG. 7 is an exploded perspective view of the stator 14 and the upper housing unit 12 before assembly. As shown in FIG. 7, the plurality of wire retainers 44 associated with the bobbins 39 disposed on the stator poles 30 engage with the plurality of upper mounting elements 54 when the stator 14 is mounted to the upper housing unit 12 during assembly. More specifically, the prong structures 45 associated with each of the wire retainers 44 associated with the bobbins 39 disposed on each of the stator poles 30 are adapted to matingly engage each of the plurality of upper mounting elements 54 of the upper housing unit 12 when the upper housing unit 12 is mounted to the stator 14 during assembly. In this manner, the prong structures 45 associated with each of the wire retainers 44 of the bobbins 39 engage each of the plurality of upper mounting elements 54 so as to secure the bobbins 39 against displacement during motor operation, and thereby eliminate or reduce the need for additional hardware for holding the bobbins 39 in place during motor operation.

Figure 8:
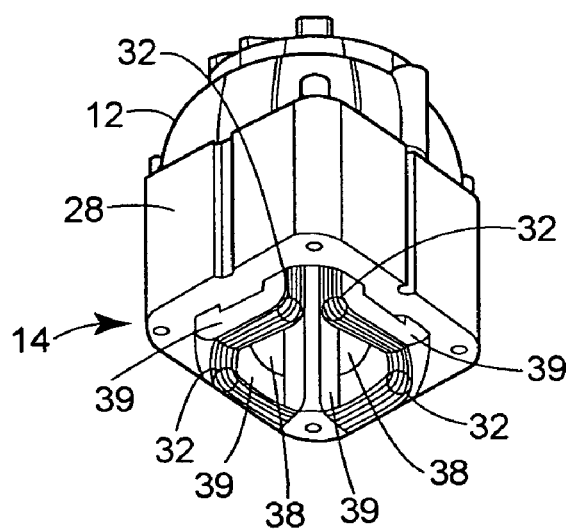
FIG. 8 is a perspective view of the stator mounted to the upper housing unit after assembly.

After the upper housing unit 12 is mounted to the stator 14, the wire leads 56a–d disposed in the plurality of upper mounting elements 54 are electrically connected to the stator windings 32 disposed on the stator poles 30a–d. Because the wire leads 56a are electrically connected in parallel with the wire leads 56c the stator windings 32 disposed on the stator poles 30a are electrically connected in parallel with the stator windings 32 disposed on the stator poles 30c to form one phase. Likewise, because the wire leads 56b are electrically connected in parallel with the wire leads 56d, the stator windings 32 disposed on the stator poles 30b are electrically connected in parallel with the stator windings 32 disposed on the stator poles 30d to form another phase. FIG. 8 is a perspective view of the upper housing unit 12 mounted to the stator 14 after assembly.

Figure 9:
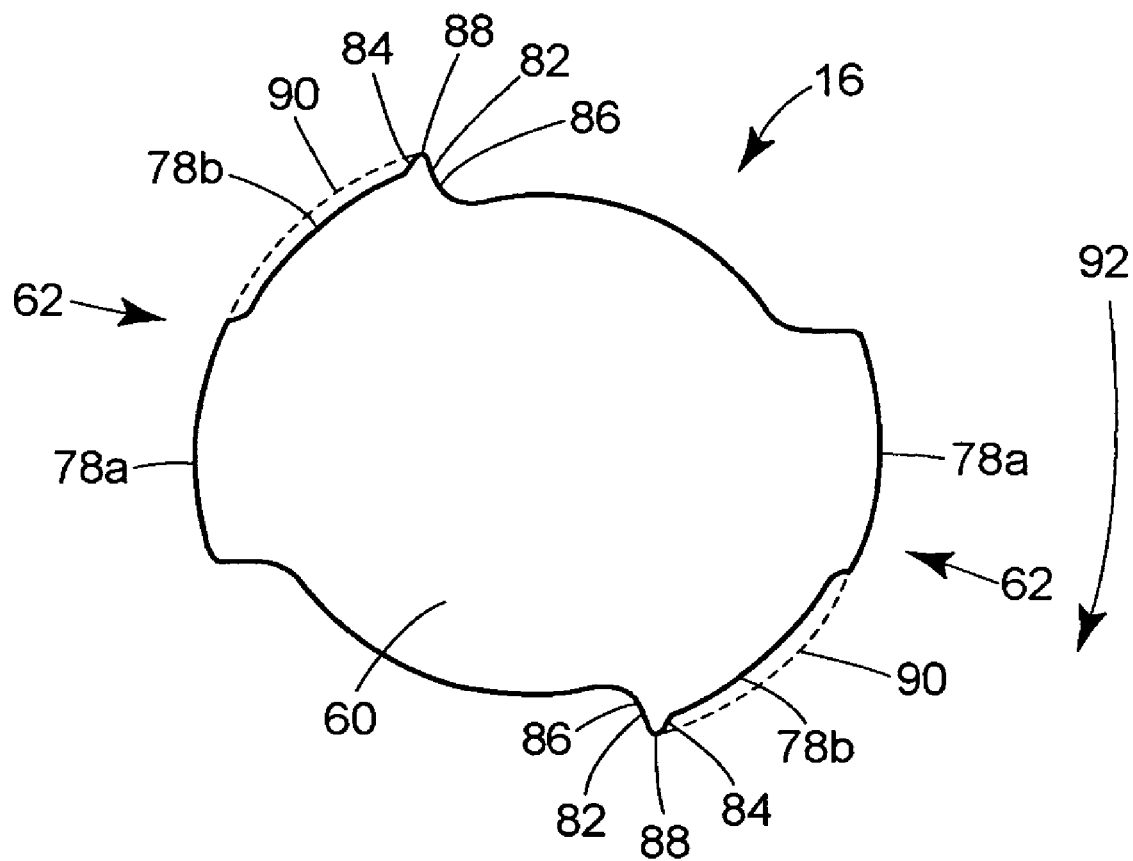
FIG. 9 is a view of the rotor of the motor shown in FIG. 1.
Figure 10:
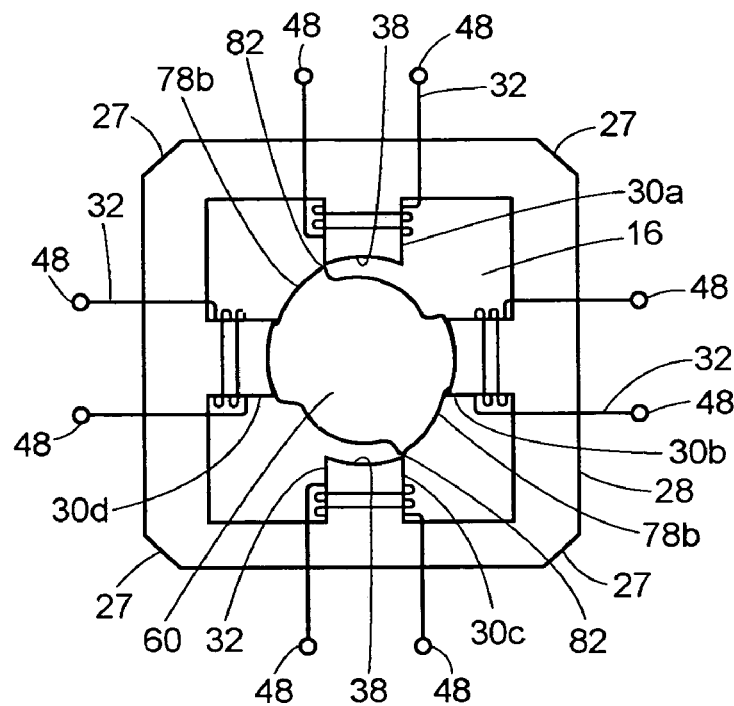
FIG. 10 is a cross-sectional view of the rotor of the motor shown in FIG. 1 disposed within an inner region of the stator core.

Referring to FIGS. 9–10, the rotor 16 may include a rotor core 60 and a plurality of equally spaced laminated rotor poles 62. The rotor core 60 is disposed within the central bore 34 and is coupled to a shaft 64 (FIGS. 1–2). The shaft 64 is mounted through a bearing 66 for rotation concentric to the stator 14. The shaft 64 extends through the rotor core 60 and is coupled to a slotted disk 71. As will be described in greater detail below, when the slotted disk 71 rotates, the angular position of the rotor 16 may be determined. The shaft 64 is also coupled to a load such as, for example, a fan of the vacuum cleaner (not shown) or other driven device. The rotor core 60 may be stamped or formed from a plurality of laminated sheets, or laminations, of ferromagnetic material such as, for example, steel. The rotor laminations may be laminated together in a conventional manner and arranged in a back-to-back configuration.

As shown in FIGS. 9–10, the plurality of rotor poles 62 are arranged in a circumferential path about the rotor core 60. The rotor poles 62 may project radially and outwardly from the shaft 64 to facilitate the rotation of the rotor 16 within the central bore 34 of the stator 14.

It is known that magnetic flux generated across the air gap between an energized stator pole 30 and a rotor pole 62 of the motor 10 creates an attractive force between the energized stator pole 30 and the rotor pole 62. The amount of attractive force is dependent upon many variables such as, for example, the magnetic properties of the materials of the stator pole 30 and the rotor pole 62, and the size of the air gap between the energized stator pole 30 and the rotor pole 62. It is further known that the attractive force between the energized stator pole 30 and the rotor pole 62 increases as the magnetic reluctance (i.e., resistance) of the magnetic circuit formed by the energized stator pole 30 and the rotor pole 62 is reduced. In other words, the low permeability properties associated with the air gap of the magnetic circuit replaces the high permeability properties of the ferromagnetic material associated with the rotor core 60. Lowering the reluctance of the air gap between the energized stator pole 30 and the rotor pole 62 by reducing its size may, in turn, increase the flux densities in the air gap such that an angle of optimum torque generation is realized. Additionally, by replacing a portion of the air gap (i.e., a low permeability medium) with steel (i.e., a high permeability medium) and keeping the magnetic field strength the same, the flux density of the air gap between the energized stator pole 30 and the rotor pole 62 is increased in accordance with the following equation:

$$B = H\mu \quad \text{(Eq. 1)}$$

where: B is the magnetic flux density;
H is the magnetic field strength; and
$\mu$ is the permeability property.

Increasing flux density of the air gap (i.e., increasing the force) increases the torque of the rotor 16 in accordance with the following equation:

$$\text{Torque} = \text{Force} \times \text{Distance from Axis} \quad \text{(Eq. 2)}$$

Figure 11:
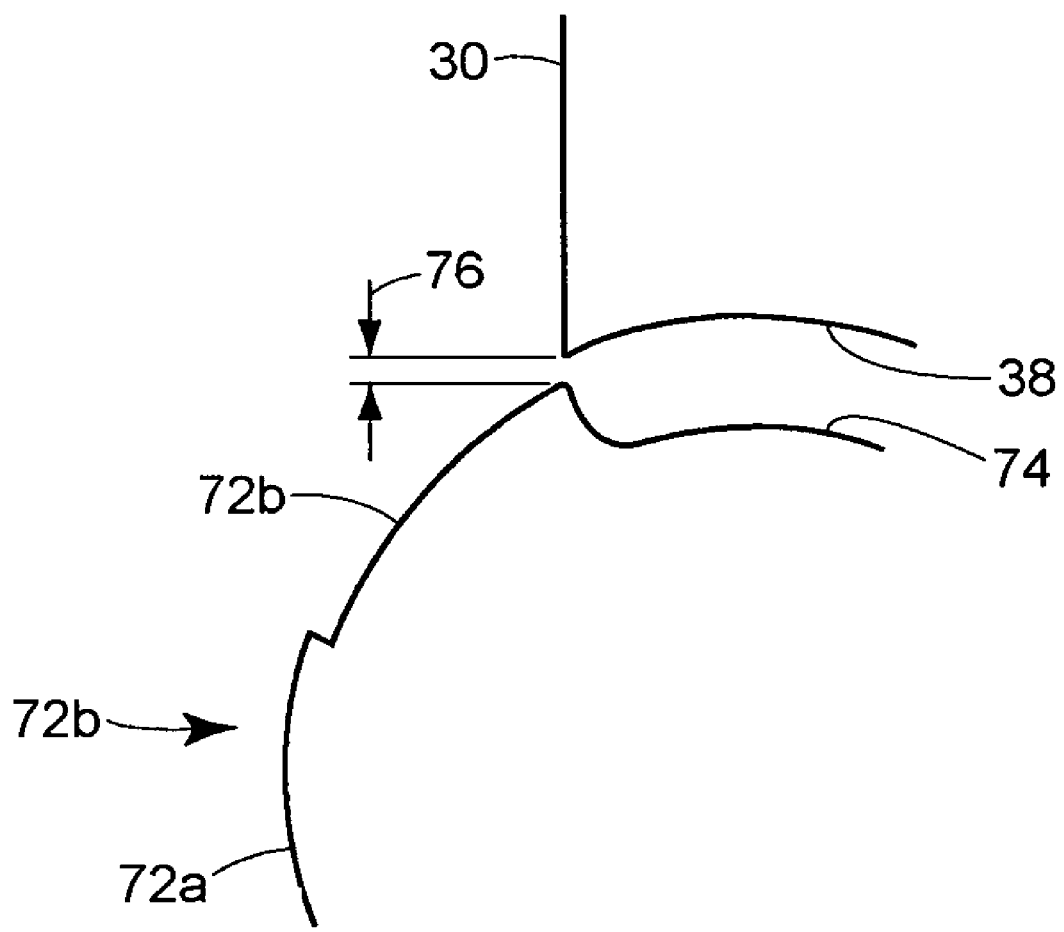
FIG. 11 is an enlarged partial view of a pole of a prior art rotor approaching a stator pole.

Referring to FIG. 11, an enlarged partial view of a rotor pole face 72 of a prior art rotor 74 is shown as it approaches a stator pole 30 in a clockwise direction. As shown in FIG. 11, the rotor pole face 72 may include a first portion 72a and a second portion 72b that is radially inwardly stepped or undercut with respect to the first portion 72a. The stepped second portion 72b creates a non-uniform or stepped air gap 76 between the rotor pole face 72 of the prior art rotor 74 and a corresponding stator pole face 38 associated with an energized stator pole 30 during rotation of the prior art rotor 74. The stepped or undercut nature of the second portion 72b of the rotor pole face 72 relative to the first portion 72a facilitates starting of the motor 10 in one direction by increasing the torque in a desired direction of rotation. It should be understood that starting of the motor 10 may be facilitated in the opposite direction by changing the orientation of the stepped or undercut portion. For example, if the first portion 72a is stepped or undercut relative to the second portion 72b, the motor 10 may be started in the opposite direction.

Figure 12:
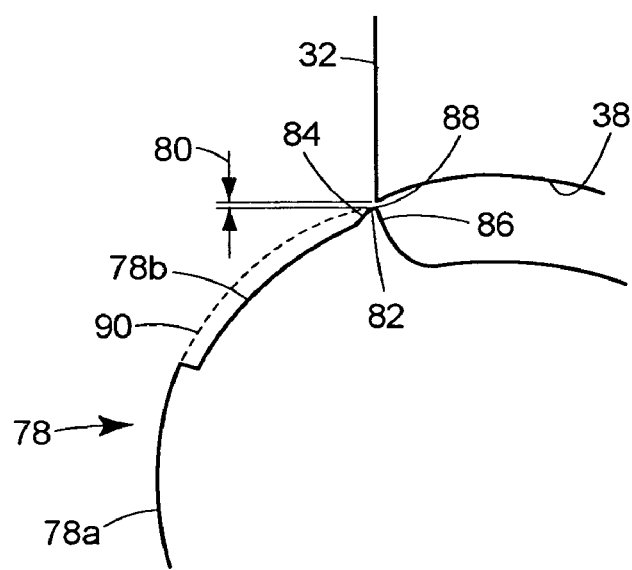
FIG. 12 is an enlarged partial view of a rotor pole of the motor shown in FIG. 1 approaching a stator pole.

Referring to FIG. 12, an enlarged partial view of a rotor pole 62 of the rotor 16 in accordance with the present disclosure is shown as the rotor pole 62 approaches a stator pole 30 in a clockwise direction. As shown in FIG. 12, the rotor poles 62 may include a rotor pole face 78 that includes a first portion 78a and a second portion 78b that is radially inwardly stepped or undercut with respect to the first portion 78a. The stepped or undercut second portion 78b of the rotor pole face 78 creates a non-uniform or stepped air gap 80 between the second portion 78b of the rotor pole face 78 and a corresponding stator pole face 38 associated with an energized stator pole 30 during rotation of the rotor 16. As a result, the air gap 80 between the stepped or undercut second portion 78b of the rotor pole face 78 and the stator pole face 38 is larger than the air gap 80 between the first portion 78a of the rotor pole face 78 and the stator pole face 38.

Because the rotor 16 tends to rotate toward a position in which the air gap 80 is minimized and, therefore, inductance is maximized, the air gap 80 between the second portion 78b of the rotor pole face 78 and the stator pole face 38 (which is larger than the air gap 80 between the first portion 78a of the rotor pole face 78 and the stator pole face 38) ensures that the leading edge of the rotor pole face 78 is always attracted to the energized stator pole 30 during motor operation.

Additionally, the air gap 80 between the second portion 78b of the rotor pole face 78 and the stator pole face 38 (which is larger than the air gap 80 between the first portion 78a of the rotor pole face 78 and the stator pole face 38) ensures that the rotor 16 rotates in one direction only, i.e., the rotor 16 tends to rotate in the direction of the stepped or undercut portion. For example, if the stepped or undercut portion is located on the right side of the rotor pole face 78, the rotor 16 will tend to rotate to the right or in a clockwise direction. On the other hand, if the stepped or undercut portion is located on the left side of the rotor pole face 78, the rotor 16 will tend to rotate to the left or in a counter-clockwise direction.

Each of the rotor pole face 78 and the stator pole face 38 may define an arc, with the rotor pole face 78 being approximately twice as large as the stator pole face 38.

In accordance with one aspect of the present disclosure, a protrusion 82 may be located at a leading edge of the second portion 78b of the rotor pole face 78 that is remote from the first portion 78a of the rotor pole face 78. The protrusion 82 minimizes the air gap 80 at the edge of the second portion 78b of the rotor pole 62 for magnetic flux flow, thereby optimizing torque characteristics of the motor 10. The protrusion 82 is composed of the same or a similar material as the rest of the rotor 16, and includes a first side 84 and a second side 86. Each of the first side 84 and the second side 86 of the protrusion 82 tapers toward an end point 88 of the protrusion 82. As shown in FIG. 12, the end point 88 of the protrusion 82 may be tangential with a circumference 90 of the first portion 78a of the rotor pole face 78. More specifically, the first side 84 of the protrusion 82 may taper toward the end point 88 such that the first side 84 is slightly concave. Alternatively, the first side 84 of the protrusion 82 may taper toward the end point 88 such that the first side 84 is generally linear.

Figure 13A:
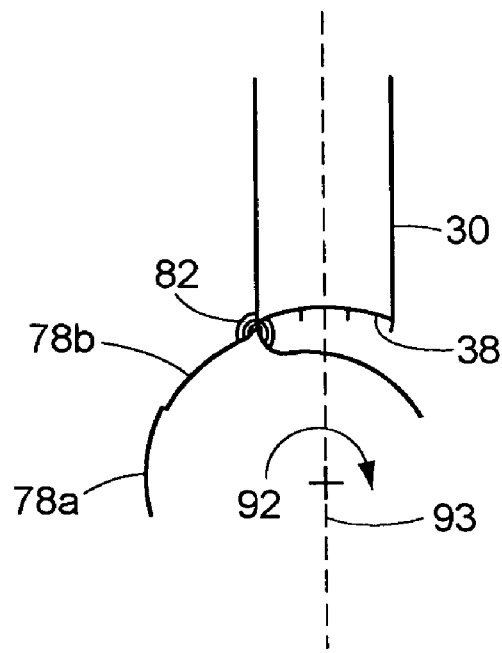
FIGS. 13A–13B are partial views of a rotor pole of the motor shown in FIG. 1 as the it approaches the stator pole in a clockwise direction.
Figure 13B:
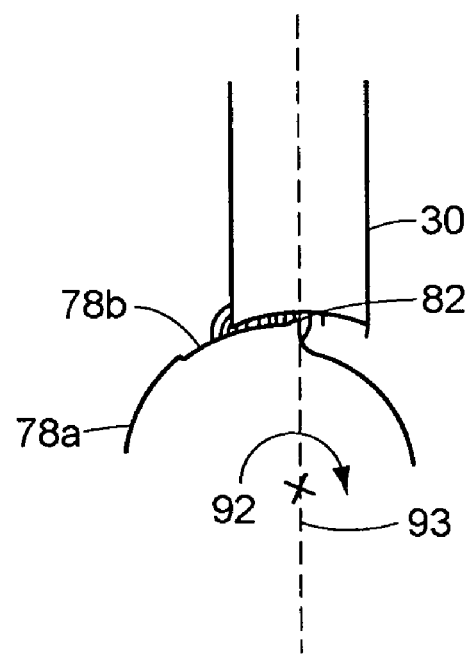

Referring to FIGS. 13A–13B, partial views of a rotor pole 62 of the rotor 16 of FIG. 9 are shown in a plurality of angular positions associated with one phase cycle. More specifically, FIGS. 13A–13B are partial views of the rotor pole 62 of the rotor 16 as the rotor pole 62 approaches the stator pole 30 in a clockwise direction indicated by arrow 92. For purposes of discussion, a stator pole reference line 93 is shown in FIGS. 13A–13B.

FIG. 13A shows the position of the rotor 16 near the beginning of a phase cycle. As shown in FIG. 13A, the air gap 80 between the protrusion 82 located at the edge of the second portion 78b of the rotor pole face 78 and the stator pole face 38 is smaller than the air gap 80 between the rest of the second portion 78b of the rotor pole face 78 and the stator pole face 38 in this position. As a result, the flux density at the air gap 80 between the protrusion 82 and the stator pole face 38 is maximized in this position, thereby causing the rotor 16 to be pulled toward the energized stator pole 30 in the direction of arrow 92.

Magnetic flux seeks the path of minimum reluctance. Therefore, because the rotor pole 62 is composed of a ferromagnetic material that has a lower reluctance than air, magnetic flux will more easily flow through the rotor pole 62 and the stator pole 30 than through the air gap 80.

FIG. 13B shows the position of the rotor 16 when the rotor 16 has been rotated in the direction of arrow 92 such that the end point 88 of the protrusion 82 is aligned with the stator pole reference line 93. After the protrusion 82 passes the stator pole reference line 93, the rotor 16 will tend to be pulled in the opposite direction of rotation, i.e., a counter-clockwise direction in this embodiment. However, this pulling in the opposite direction of rotation is offset by the positive motoring torque due to the first portion 78a of the rotor pole face 78. Therefore, the rotor 16 continues to be pulled toward the energized stator pole 30 in the direction of arrow 92.

Figure 14:
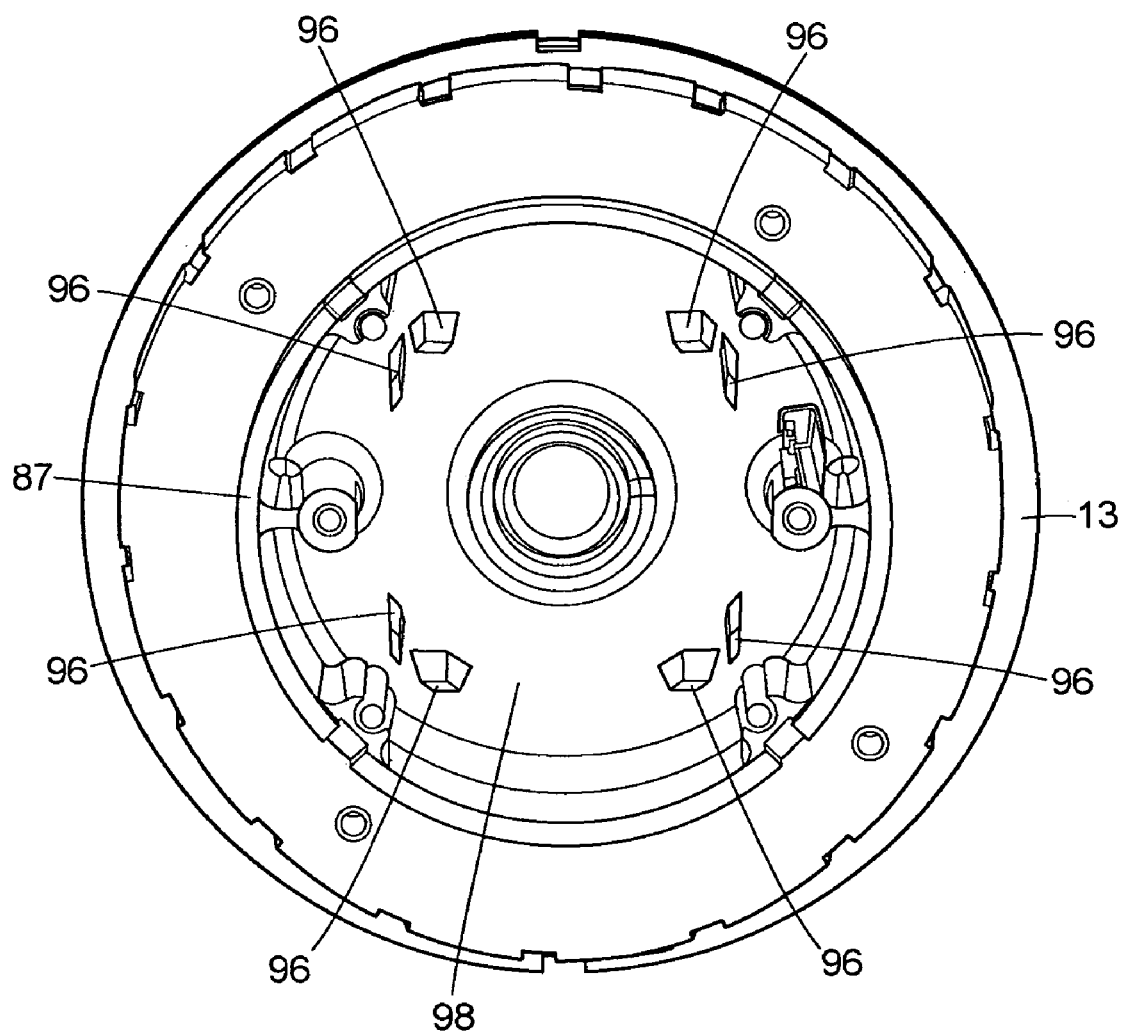
FIG. 14 is a top view of a lower housing unit of the motor shown in FIG. 1, including a first plurality of mounting elements for receiving a lower portion of each of the plurality of bobbins of the stator in accordance with one embodiment.

Referring to FIG. 14, a top view of the lower housing unit 13 of the motor 10 is shown. As discussed above, the lower housing unit 13 has a generally annular shape. It should be understood, however, that the lower housing unit 13 may have other shapes such as, for example, a rectangular shape, a square shape, or the like. The lower housing unit 13 includes a ring structure 87 and a plurality of lower mounting elements 96. The ring structure 87 is located within an inner region 98 of the lower housing unit 13. As shown in FIG. 14, the ring structure 87 may extend about the circumference of the lower housing unit 13.

Each of the plurality of lower mounting elements 96 engages a bottom portion of a bobbin 39 when the stator 14 is mounted to the lower housing unit 13 in accordance with one embodiment. Each of the plurality of lower mounting elements 96 acts to secure the bottom portion of the bobbins 39 against displacement during motor operation.

Figure 15:
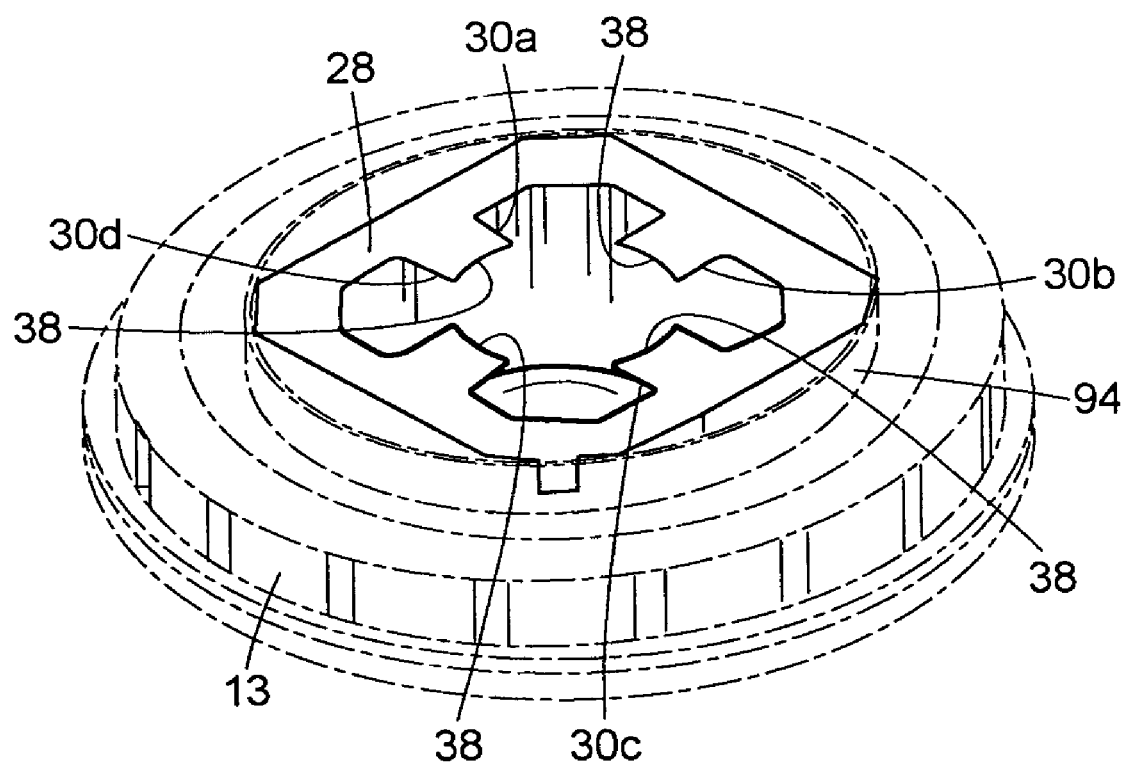
FIG. 15 is a top perspective view of the stator of the motor shown in FIG. 1 mounted to the lower housing unit.
Figure 16:
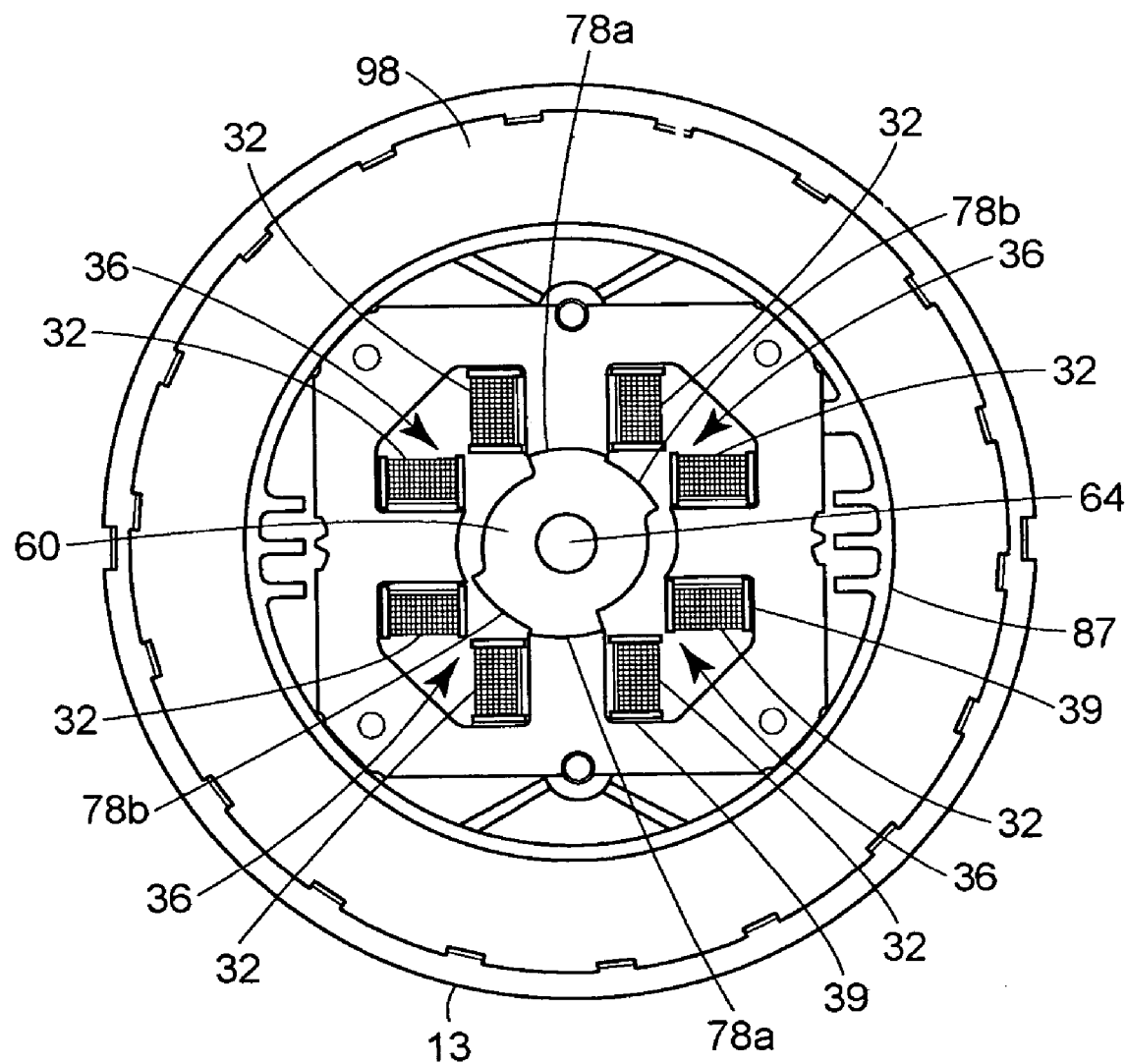
FIG. 16 is a top view of the stator and the rotor of the motor shown in FIG. 1 mounted to the lower housing unit.
Figure 17:
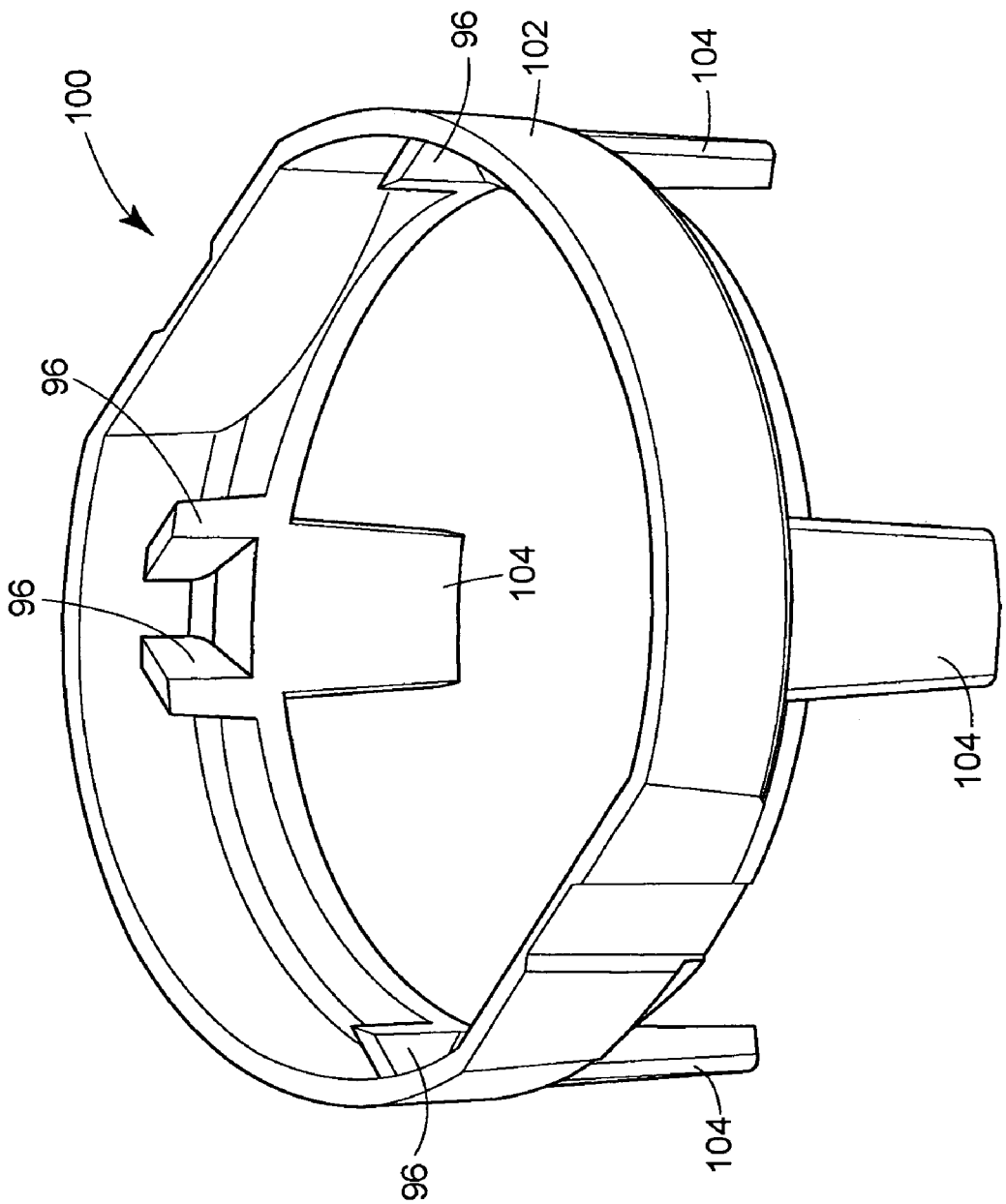
FIG. 17 is a perspective view of an insulating member, including a first plurality of mounting elements for receiving a lower portion of each of the plurality of bobbins of the stator in accordance with another embodiment.
Figure 18:
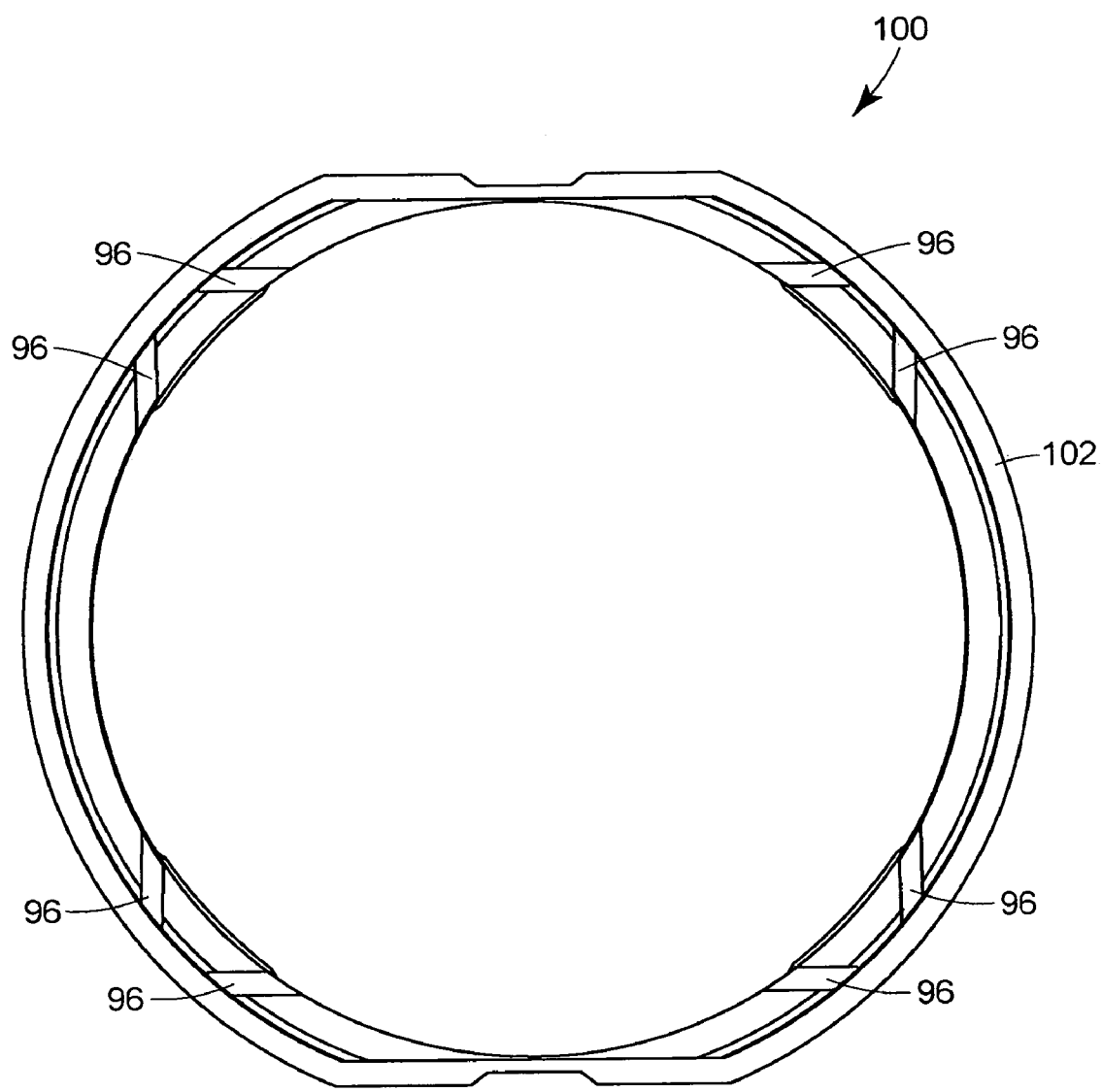
FIG. 18 is a top view of the insulating member shown in FIG. 17.
Figure 19:
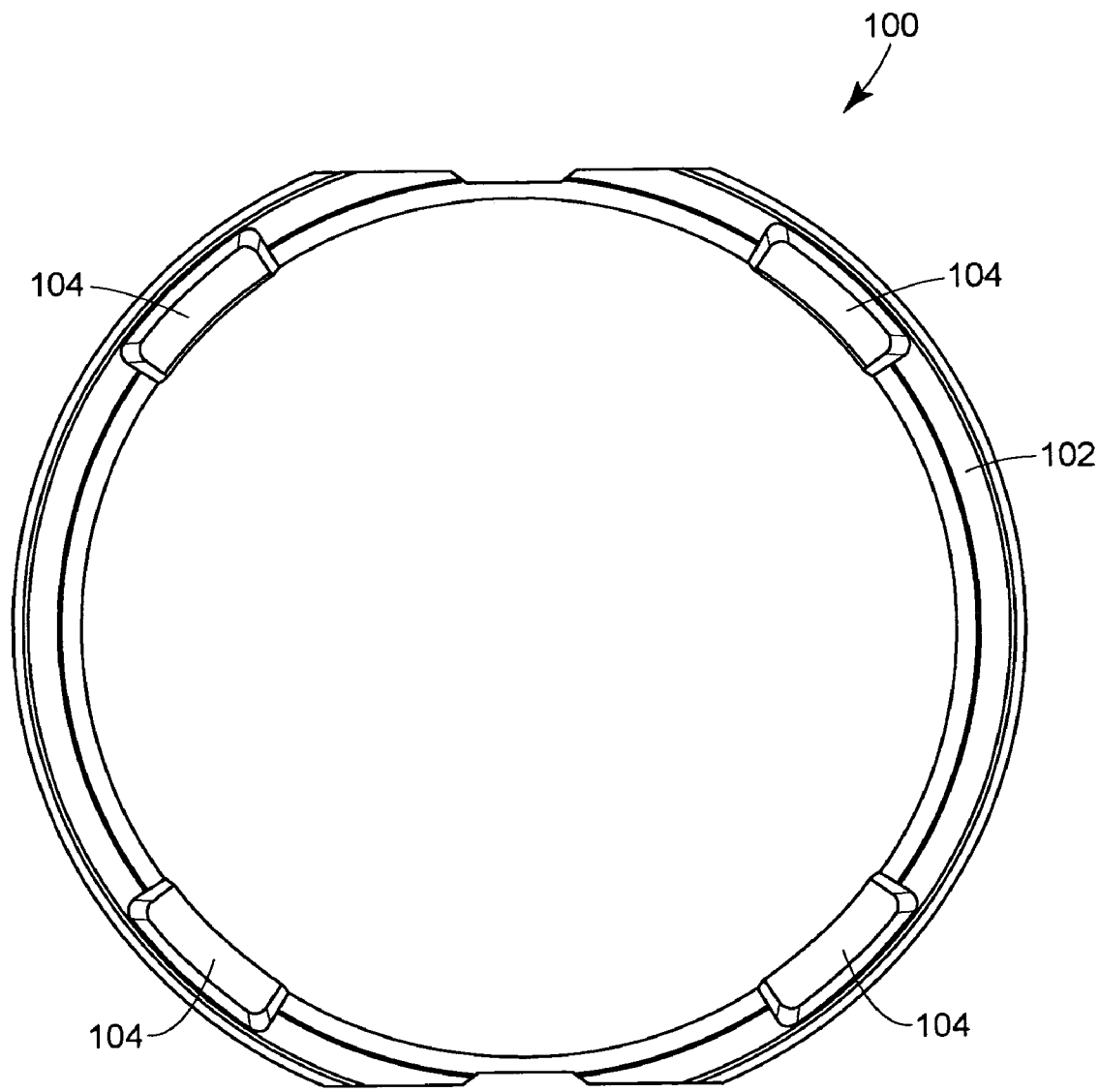
FIG. 19 is a bottom view of the insulating member shown in FIG. 17.
Figure 20:
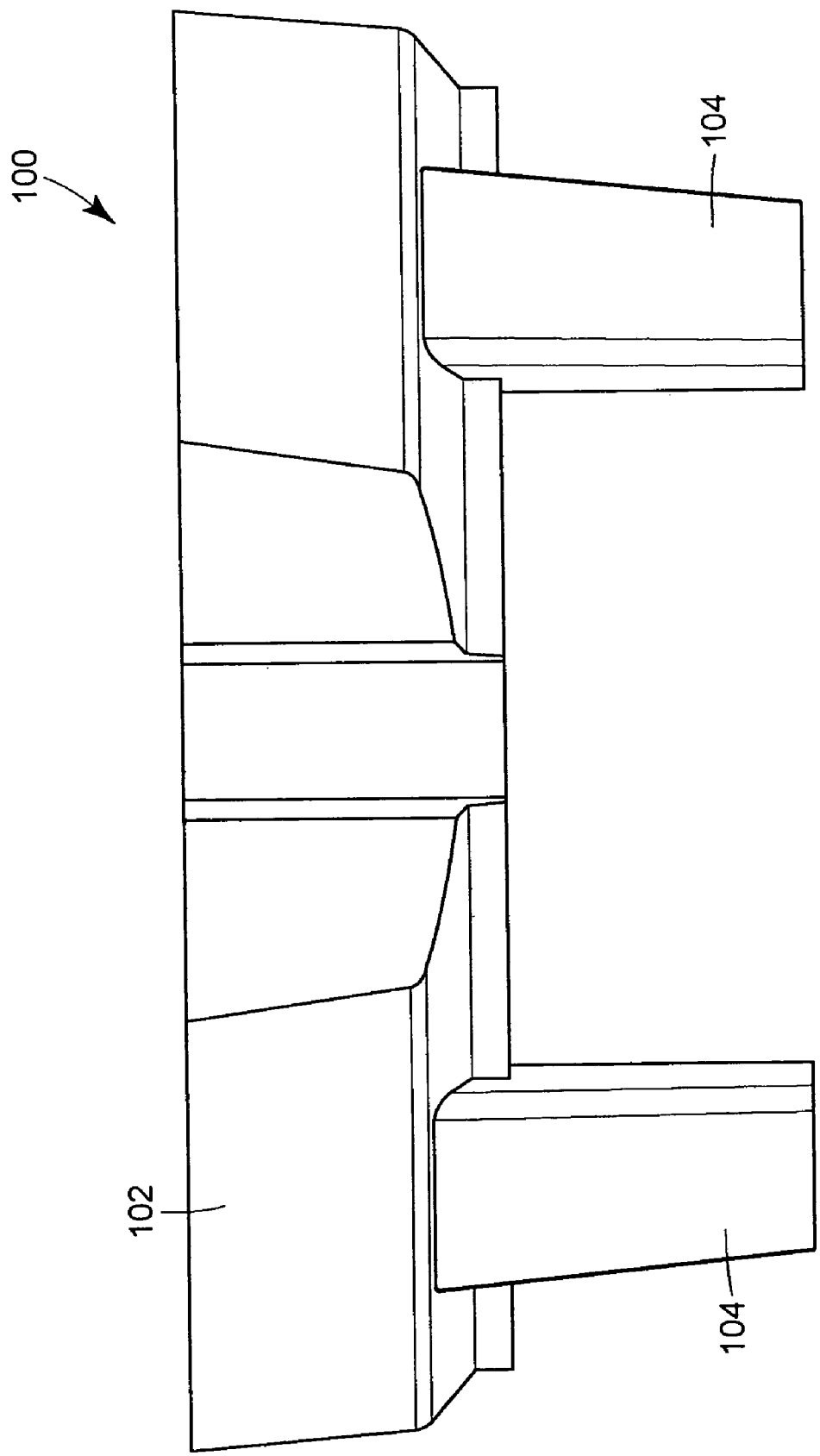
FIG. 20 is side view of the insulating member shown in FIG. 17.
Figure 21:
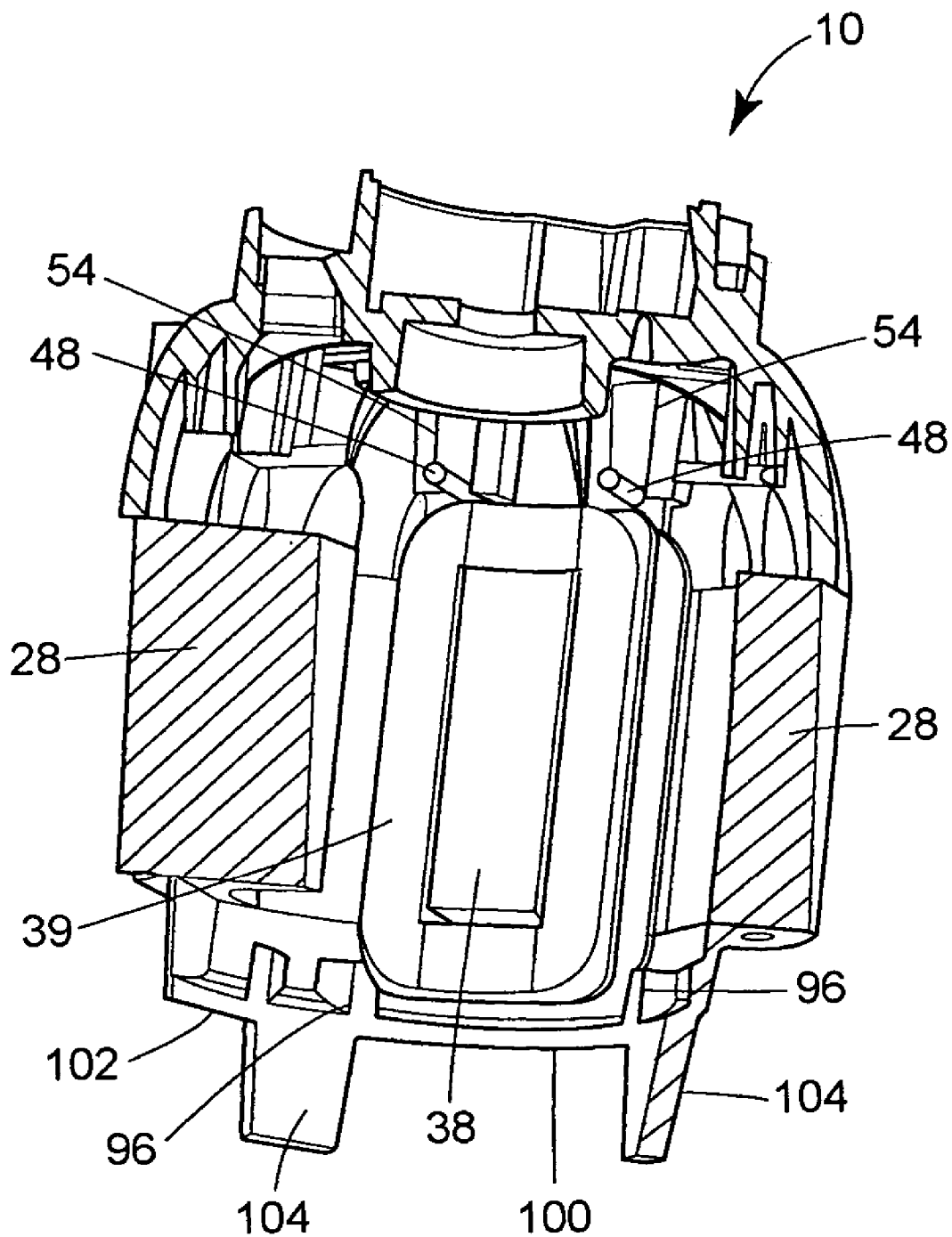
FIG. 21 is a perspective view of one of the plurality of bobbins of the motor shown in FIG. 1 disposed within the one of the first plurality of mounting elements of the insulating member shown in FIG. 17.

FIG. 15 is a top perspective view of the stator 14 mounted to the lower housing unit 13. FIG. 16 is a top view of the stator 14, including the bobbins 39 having prewound stator windings 32, mounted to the lower housing unit 13. FIG. 16 further shows the rotor 16 disposed within the central bore 34 of the stator 14.

Referring to FIGS. 17–21, an alternative embodiment in which the plurality of lower mounting elements 96 is disposed in an insulating member 100 is shown. In the embodiment, the insulating member 100 is mounted to the lower housing unit 13. As shown, the insulating member 100 includes an annular ring structure 102 having legs 104 extending from a bottom side of the ring structure 102. It should be understood, however, that the ring structure 102 may have other configurations such as, for example, a square configuration, a rectangular configuration, or the like. Each of the legs 104 of the ring structure 102 may engage sockets (not shown) associated with the lower housing unit 13 during assembly. After assembly, each of the lower mounting elements 96 engages the bottom portion of a bobbin 39 to secure the bottom portion of the bobbin 39 against displacement during motor operation.

Operation of the Control Circuit

Figure 22:
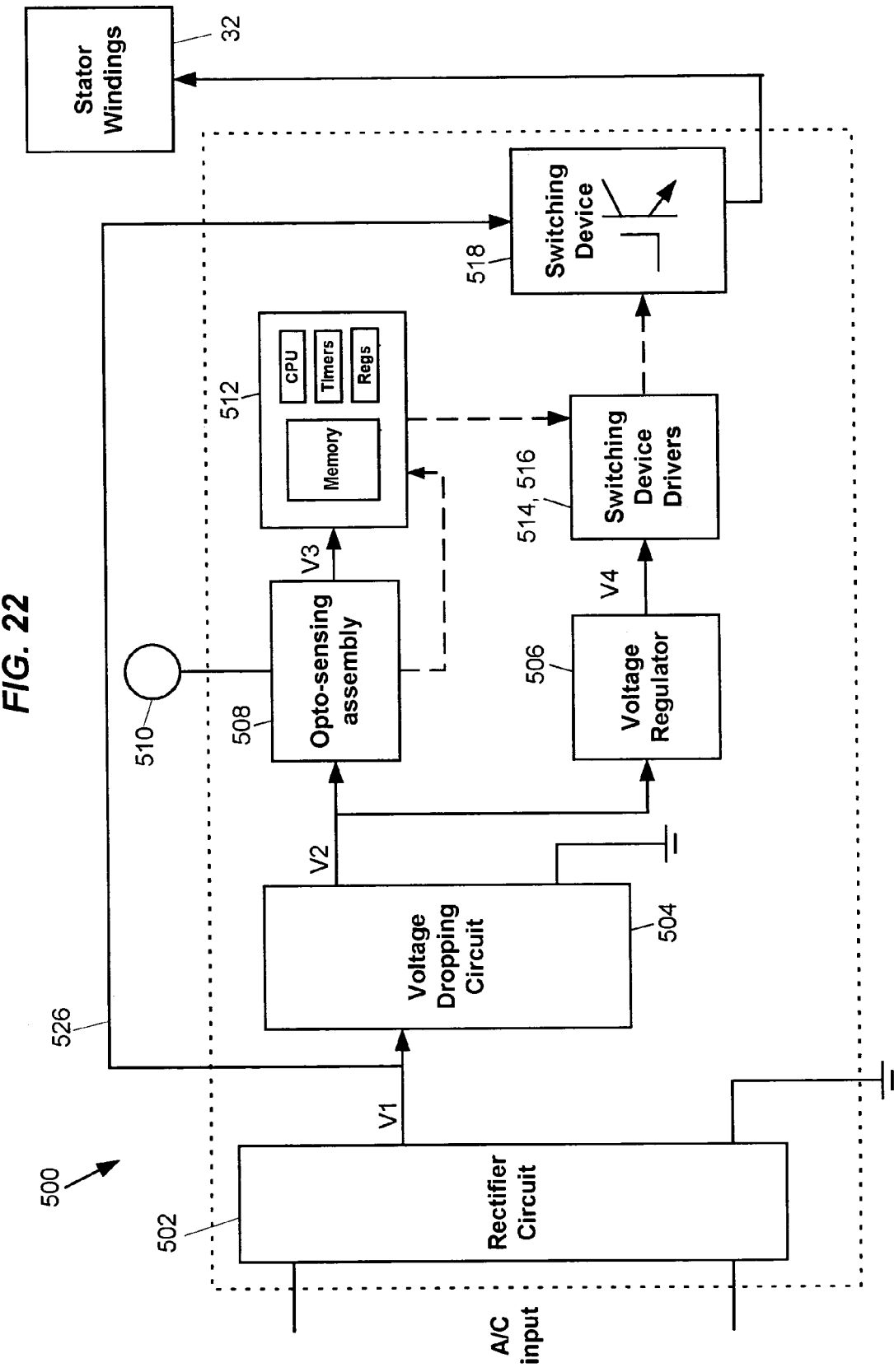
FIG. 22 illustrates a block diagram of a control circuit for the switched reluctance motor.

The drive assembly 18 used to drive the motor 10 includes a control circuit 500, which is further described below in FIG. 22. Specifically, FIG. 22 illustrates a block diagram of the control circuit 500 used to control the operation of the motor 10, by controlling the power supply to the stator windings 32. The control circuit 500 includes a rectifier circuit 502 that converts an AC input power into unregulated DC power V1, which is fed to the stator windings 32 via a switching device 518, as discussed below. The DC power V1 is also fed to a voltage dropping circuit 504. The voltage dropping circuit provides unregulated voltage V2 to a voltage regulator circuit 506 and to a micro-controller 512 via an opto-sensing assembly 508.

The opto-sensing assembly 508 operates in conjunction with a slotted disk 71, which is rotatable with the rotor 16, to monitor the rotational speed of the motor 10. The opto-sensing assembly 508 generates a rotor position signal that is used by the micro-controller 512 to measure the speed of the rotor 16. The micro-controller 512 may include one or more of the commonly known components such as memory, a CPU, a plurality of registers, a plurality of timers, etc.

The voltage regulator 506 generates a regulated output voltage V4 that is input to switching device drivers 514 and 516, which control a switching device 518. The switching device 518 is used to control voltage input to the stator windings 32. The switching device 518 may be implemented by a number of electronic switching mechanisms, such as transistors, thyristors, etc. An implementation of the switching device 518 using insulated gate bipolar transistors (IGBTs) is illustrated in further detail in FIG. 23 below. The switching device 518 receives power V1 from the rectifier circuit 502 and provide the power to the stator windings 32 as per the control signals received from the switching device drivers 514 and 516. Functioning of the switching device 518 to control stator windings 32 is well known to those of ordinary skill in the art. Various components of the control circuit 500 are illustrated in further detail in FIG. 23 below, while the operation of the voltage regulator 506 is explained in further detail in FIG. 25 below.

While the control circuit 500 receives AC input power of 120 V, in an alternate implementation, a different level of input power may be selected. The rectifier circuit 502 may be any of the commonly available type of rectifier circuit that converts an AC input power into an unregulated DC output power, such as a bridge rectifier.

The voltage dropping circuit 504 is conventional and may be implemented using a set of dropping resistors, a Zener diode, and a capacitor. The output V2 of the voltage dropping circuit 504 is connected via the opto-sensing circuit 508 to the microcontroller 512, and to the voltage regulator 506. Because the output V2 of the voltage dropping circuit is unregulated, another conventional voltage regulator (not shown) may be used to convert such unregulated voltage V2 into a regulated voltage to be input into the microcontroller 512. The micro-controller 512 may be implemented by using any of the various micro-controller integrated circuits, such as a Z86 type of integrated circuit.

The voltage regulator 506 generates a DC output voltage of 15V that is used to drive the switching device drivers 514 and 516. An output of the voltage dropping circuit 504 is sourced through the opto-sensing assembly 508. In this manner, the supply current to the opto-sensing assembly 508 is not directly dissipated in the dropping resistors of the voltage dropping circuit 504. Therefore, the opto-sensing assembly 508 also functions as a conductor of the current that is eventually input to the micro-controller 512.

Figure 23:
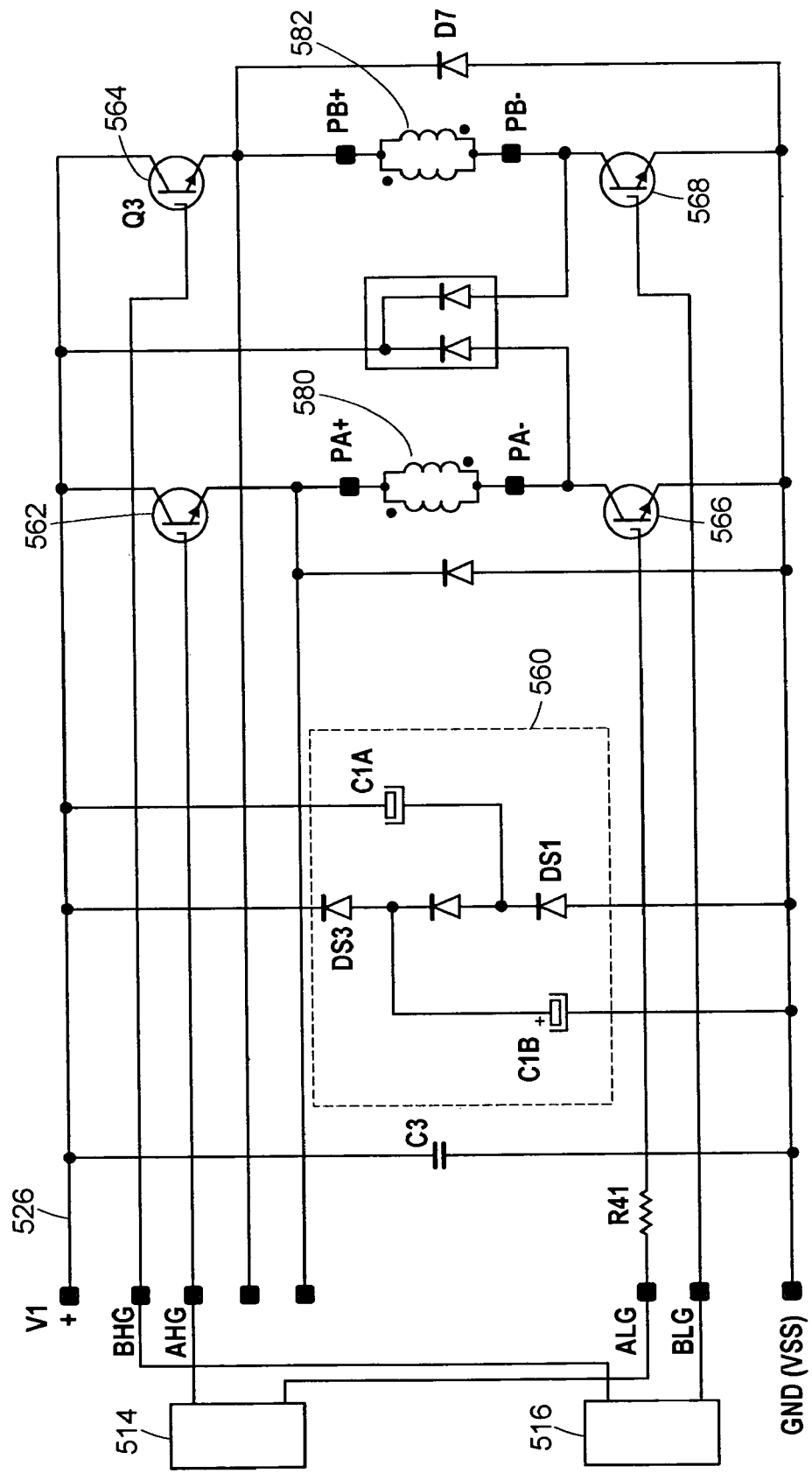
FIG. 23 illustrates a circuit diagram of the control circuit corresponding to the block diagram of FIG. 22.

FIG. 23 illustrates an implementation of the control circuit 500 wherein the switching device 518 is implemented by IGBTs 562–568. The IGBTs 562–568 control the current passing through a first phase 580 and the second phase 582 of the stator windings 32. The IGBTs 562 and 564 are connected to the high voltage end of the first phase 580 and the second phase 582, respectively, and are known as the high side IGBTs, while the IGBTs 566 and 568 are connected to the low voltage end of the first phase 580 and the second phase 582, respectively, and are known as the low side IGBTs. The IGBTs 562–568 receive their control input signals AHG, ALG, BLG and BHG from the switching device drivers 514 and 516. In an implementation of the control circuit where the switching device 518 are implemented by the IGBTs 562–568, the switching device drivers 514 and 516 may be implemented by using one of the many well known integrated IGBT driver circuits, such as IR2101S integrated circuit, available from International Rectifiers, Inc.

The first switching device driver 514 generates a high side output AHG and a low side output ALG to drive the first phase 580. Specifically, the high side output AHG is used to drive the high side IGBT 562 and the low side output ALG is used to drive the low side IGBT 566. The second switching device driver 516 generates a high side output BHG and a low side output BLG to drive the second phase 582. Specifically, the high side output BHG is used to drive the high side IGBT 564 and the low side output BLG is used to drive the low side IGBT 568.

In an implementation of the control circuit, the turning on and off of the IGBTs 562–568 is controlled in a manner so as to allow sufficient time to drain the current generated in the stator windings 32 due to magnetic collapse of the stator windings 32. For example, for the first phase 580, instead of turning off the IGBTs 562 and 566 simultaneously, when the IGBT 562 is turned off, the IGBT 566 is kept on for a time period sufficient to allow dumping of the magnetic collapse induced current of the first phase 580 through the IGBT 566 to ground. Similarly, for the second phase 582, instead of turning off the IGBTs 564 and 568 simultaneously, when the IGBT 564 is turned off, the IGBT 568 is kept on for a time period sufficient to allow dumping of the magnetic collapse induced current of the second phase 582 through the IGBT 568 to the ground.

Output 526 contains AC ripple, which is preferably filtered before it is applied to the stator windings 32. Therefore, the first leg of output 526 is applied to a DC bus filter network 560, as shown in FIG. 23. The filter network 560 includes diodes DS1, DS2, DS3 and capacitors C1A and C1B. The filter network 560 filters out AC ripple from both the positive going power and the negative going power return legs of the first leg of output power 526. The resulting filtered voltage output by the filter network 560 is 120V DC under load, and it can source about 15 amperes of continuous current.

As shown in FIG. 23, the resulting DC bus voltage output from the filter network 560 is applied directly to the collectors of series switching IGBTs 562 and 564, and to the emitters of series switching IGBTs 566 and 568. The IGBTs 562–568 receive their gate inputs from the switching device drivers 514 and 516.

Figure 24:
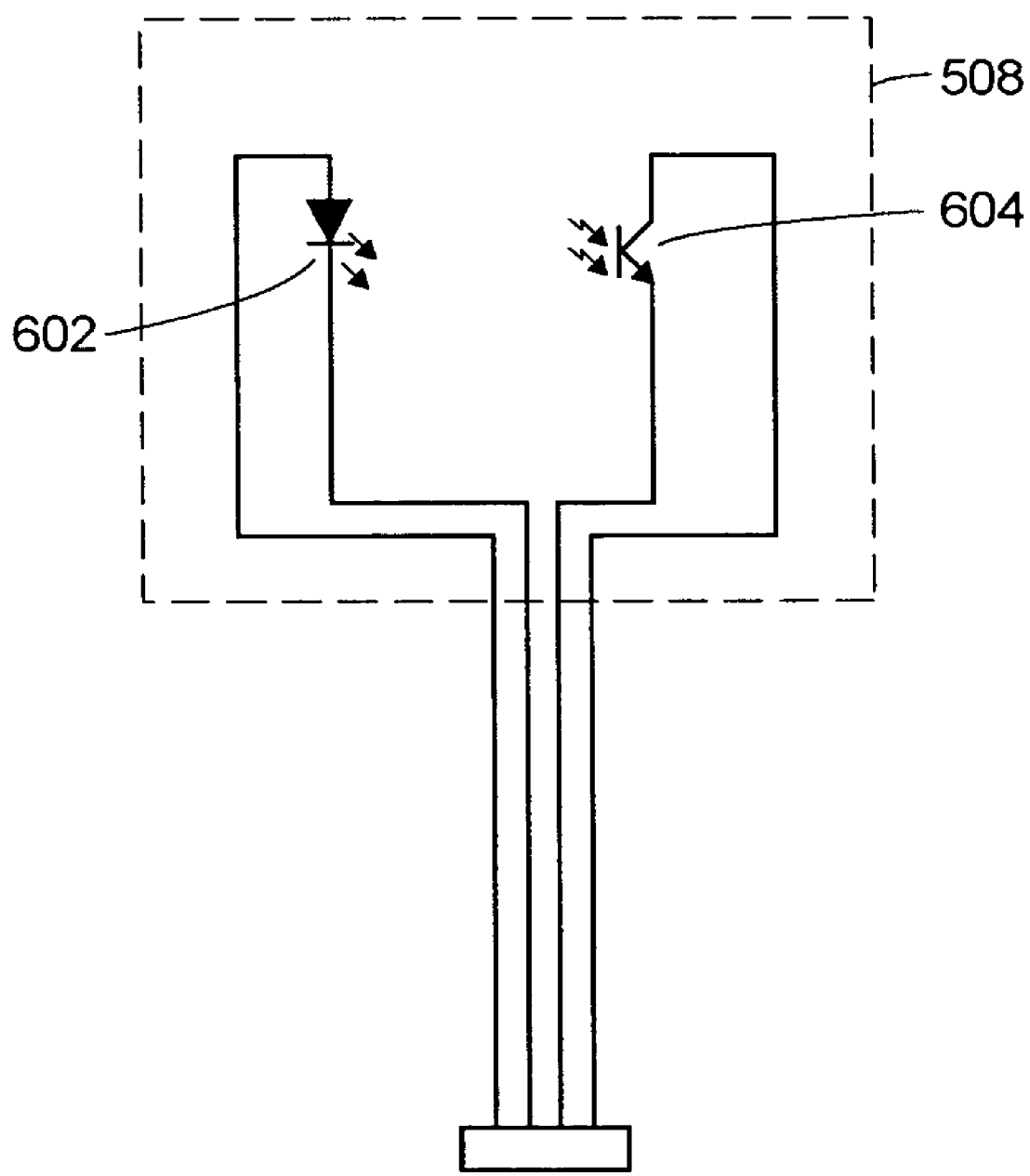
FIG. 24 illustrates a circuit diagram of an optical sensor assembly used in the control circuit of FIG. 22.

FIG. 24 illustrates a circuit diagram of the opto-sensing assembly 508, which may be implemented by a conventional optical sensor assembly, such as Honeywell P/N HOA1887-011 from Honeywell, Inc., or Optek P/N OPB830W11 from Optek, Inc. The opto-sensing assembly 508 includes a light emitting diode (LED) 602 and a silicon photo-transistor 604, where the LED 602 receives a DC output voltage from the voltage dropping circuit 504. The LED 602 and the photo-transistor 604 are placed on the opposite sides of the slotted disk 71, which is attached to the rotor 16, and therefore rotates at the speed of the rotor 16.

Each time the edge of the slotted disk 71 passes between the LED 602 and the photo-transistor 604, the signal generated by the photo-transistor 604 changes from one level or state to another. The signal output from the photo-transistor 604 is input to the micro-controller 512. The micro-controller 512 calculates the speed and the position of the rotor 16 based on the calculated period. Calculation of the speed of the rotor 16 using the time period for each rotation of the rotor 16 is conventional and therefore is not further described.

Figure 25:
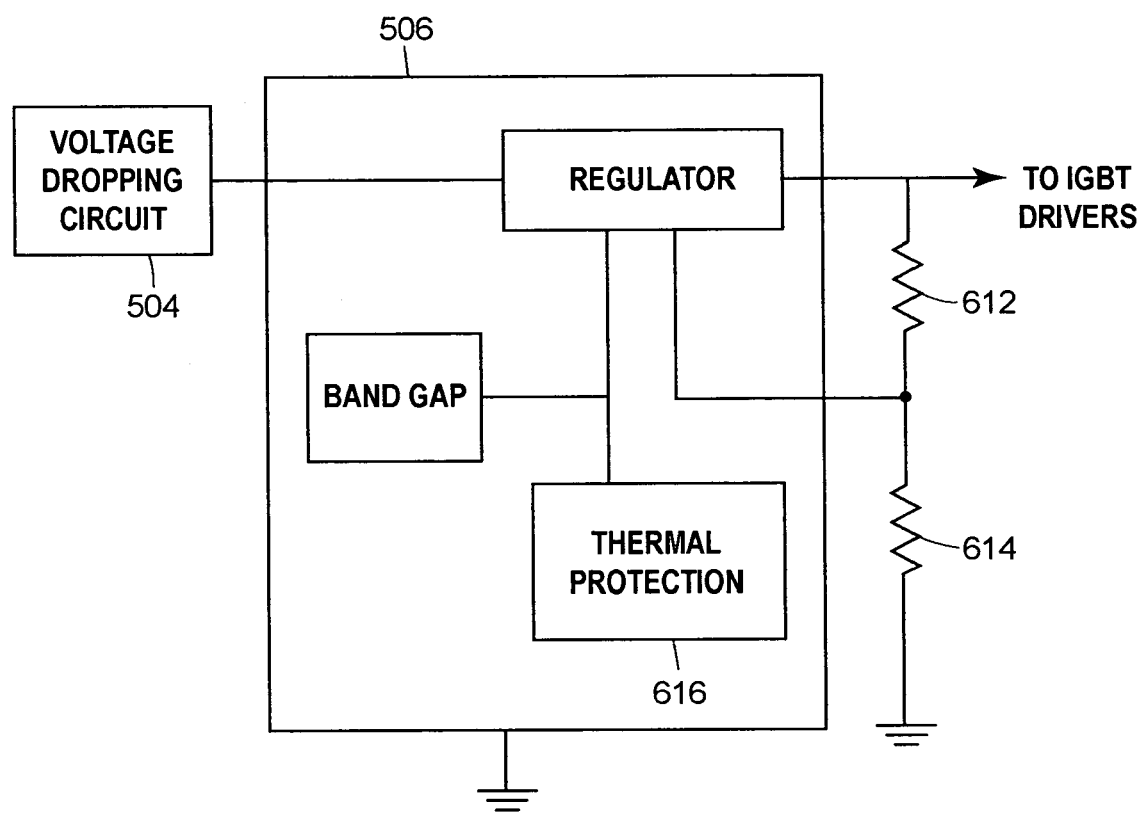
FIG. 25 illustrates a block diagram of a voltage regulator used in the control circuit of FIG. 22.

FIG. 25 illustrates an exemplary implementation of the voltage regulator 506. In this illustration, the voltage regulator 506 is implemented using integrated circuit TDA3661 from Phillips® Semiconductor, however in an alternate implementation, other similar voltage regulators may also be used. The voltage regulator 506 is supplied voltage from the output of the voltage dropping circuit 504. The output voltage of the voltage regulator 506 can be adjusted by means of an external resistor divider comprising the resistors 612 and 614.

Due to the functioning of the motor 10, as well as due to the continuous operation of the control circuit 500, it is quite possible that the temperature of the control circuit 500 may rise substantially. To avoid any damage to the control circuit 500 and various components located upon it, the control circuit 500 is designed with a thermal shutdown feature. The voltage regulator 506 includes a thermal protection device 616 that measures the temperature of the voltage regulator 506 and shuts down its output voltage whenever the temperature reaches a threshold level, such as 150° C.

To use the active thermal shutdown feature of the voltage regulator 506, the substrate of the voltage regulator 506 is thermally coupled to the board of the control circuit 500 using a round copper pin. In this manner, the substrate of the voltage regulator 506 closely follows the temperature of the control circuit 500. The IGBTs 562–568 are qualified to be operable up to a temperature of 175° C. To prevent overheating, they are placed such that they are cooled by the air circulated by the motor 10. However, if for some reason such as obstruction, housing failure, etc., the cooling air to the IGBTs 562–568 is lost, the temperature of the control circuit could rise up to 150° C. In such a situation, the voltage regulator 506 will turn off due to its thermal protection device 616. Upon thermal shutdown of the voltage regulator 506, the power to the IGBT drivers 514 and 516, and therefore the power to the stator windings 32 is also shutdown. However, as described below, the power to the micro-controller 512 remains on.

The restart of the motor 10, in the event of such a thermal shutdown, is further explained by the flowchart 650 of FIG. 26. Blocks 652 and 654 illustrate constant monitoring of the temperature of the substrate of the voltage regulator 506 by the thermal protection device 616. As long as the temperature of the threshold is below a threshold level, the thermal protection device 616 continuously monitor such temperature.

When it is detected that the temperature of the substrate of the voltage regulator 506 is at or above the threshold level, the thermal protection device 616 shuts down the voltage regulator 506, and therefore, the motor 10. Conventionally, if the power switch of the motor 10 is left on, the motor 10 could re-start unexpectedly once the thermal protection device 616 senses that the temperature of the substrate of the voltage regulator 506 is below threshold. However, in the present system, because the micro-controller 512 was never shut down, the micro-controller 512 will not be in a proper start-up mode to permit such unexpected re-start of the motor 10.

In order to prevent such unexpected restart of the motor 10, the micro-controller 512 continuously monitors the speed of the motor 10, and if the micro-controller 512 detects an unexpected drop in the speed of the motor 10, indicating a thermal shutdown, at a block 658 the micro-controller 512 generates a shut-down error routine. Subsequently, at a block 660, the micro-controller 512 stops providing output signals to the switching device drivers. At a block 662, the micro-controller 512 generates a troubleshooting error code that can be used later by the manufacturer or the operator of the motor 10 for diagnostic purposes. Subsequently, as shown by the block 664, the micro-controller 512 will not restart until the entire operation of the motor 10 is recycled, that is, the on/off switch of the motor 10 has been turned off and then on. Once the recycling of the motor 10 is detected, at a block 666 the micro-controller 512 resumes the operation of the motor 10 in a normal start mode, which is described in further detail below.

Operation of the Motor Code

Conventional switched reluctance motors utilizing a micro-controller to control the commutation of power provided to the stator windings perform the same start-up routine whenever power to the circuit is turned on. However, if the power to the motor is turned off when the rotor is rotating at a high rate of speed and then quickly cycled back on (i.e., rapid cycling), using the same start-up routine often causes damage to occur to the electrical components in the motor. Typically, it is the IGBTs in the circuit that are most susceptible of damage if the motor is not allowed to coast for a period of time until the rotational speed falls below a threshold speed. A running re-start routine is described below to detect such a rapid cycling of power and to allow the rotor to coast until the rotation speed falls below a threshold speed in order to prevent damaging the IGBTs.

As previously discussed, switched reluctance motor operation is based on a tendency of a rotor 16 to move to a position where an inductance of an energized phase of stator winding(s) 32 is maximized. In other words, the rotor 16 will tend to move toward a position where the magnetic circuit is most complete. The rotor 16 has no commutator and no windings and is simply a stack of electrical steel laminations with a plurality of opposed pole faces. It is however, necessary to know the rotor's 16 position in order to sequentially energize phases of the stator windings 32 with switched direct current (DC) to produce rotation and torque.

For proper operation of the motor 10, switching should be correctly synchronized to the angle of rotation of the rotor 16. The performance of a switched reluctance motor depends in part, on the accurate timing of phase energization with respect to rotor position. Detection of rotor positions in the present embodiment is sensed using a rotor position sensor in the form of the opto-sensing assembly or optical interrupter 508.

One manner in which an exemplary system may operate is described below in connection with FIGS. 27 and 32 which represent a number of portions or routines of one or more computer programs. The majority of the software utilized to implement the routines is stored in one or more of the memories in the controller 512, and maybe written at any high level language such as C, C++, C#, Java or the like, or any low-level assembly or machine language. By storing the computer program portions therein, those portions of the memories are physically and/or structurally configured in accordance with computer program instructions. Parts of the software, however, may be stored and run in a separate memory location. As the precise location where the steps are executed can be varied without departing from the scope of the invention, the following figures do not address the machine performing an identified function.

Figure 27A:
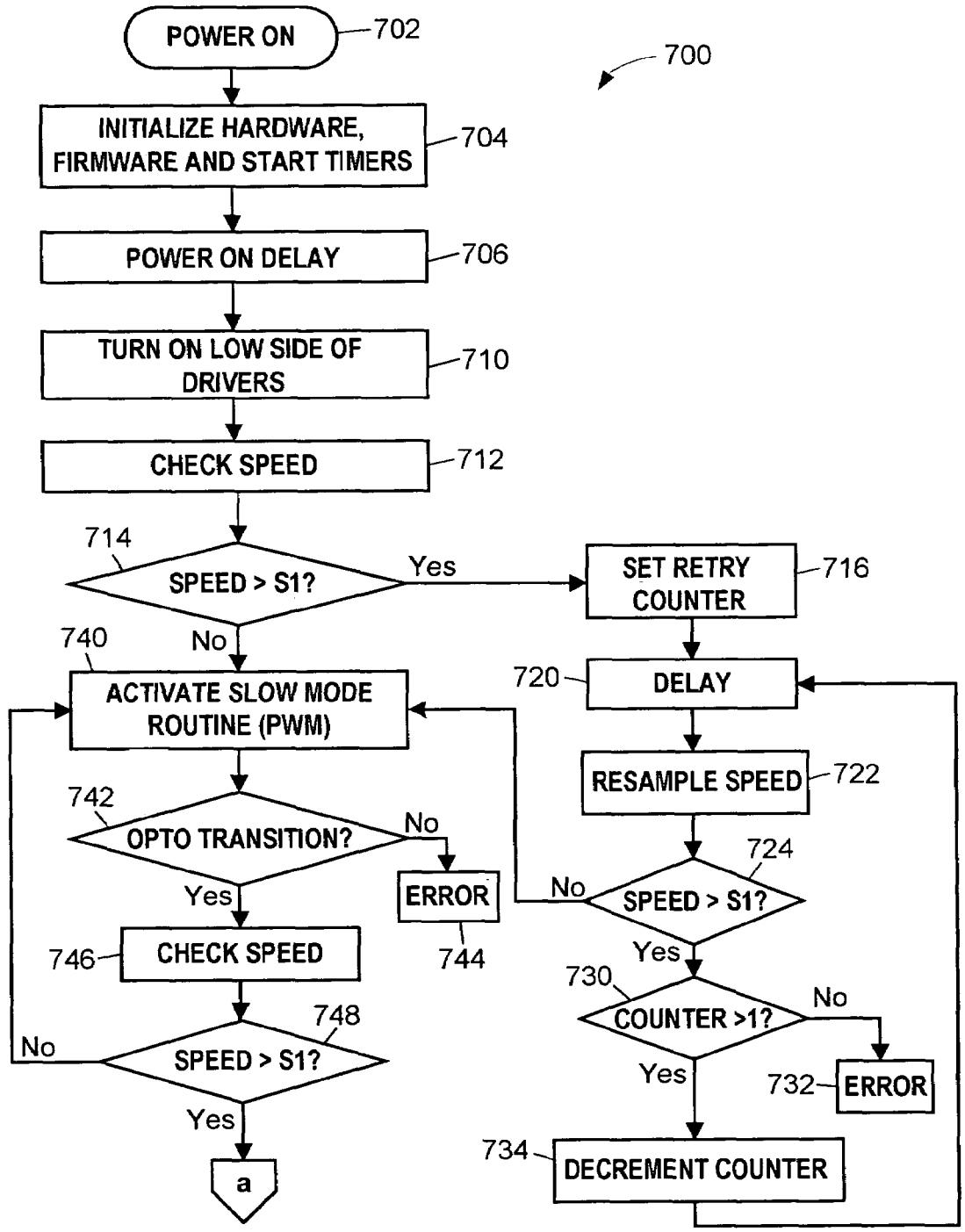
FIGS. 27A and 27B illustrate some of the steps used to synchronize the switching or commutation of the power provided to the stator windings.
Figure 27B:
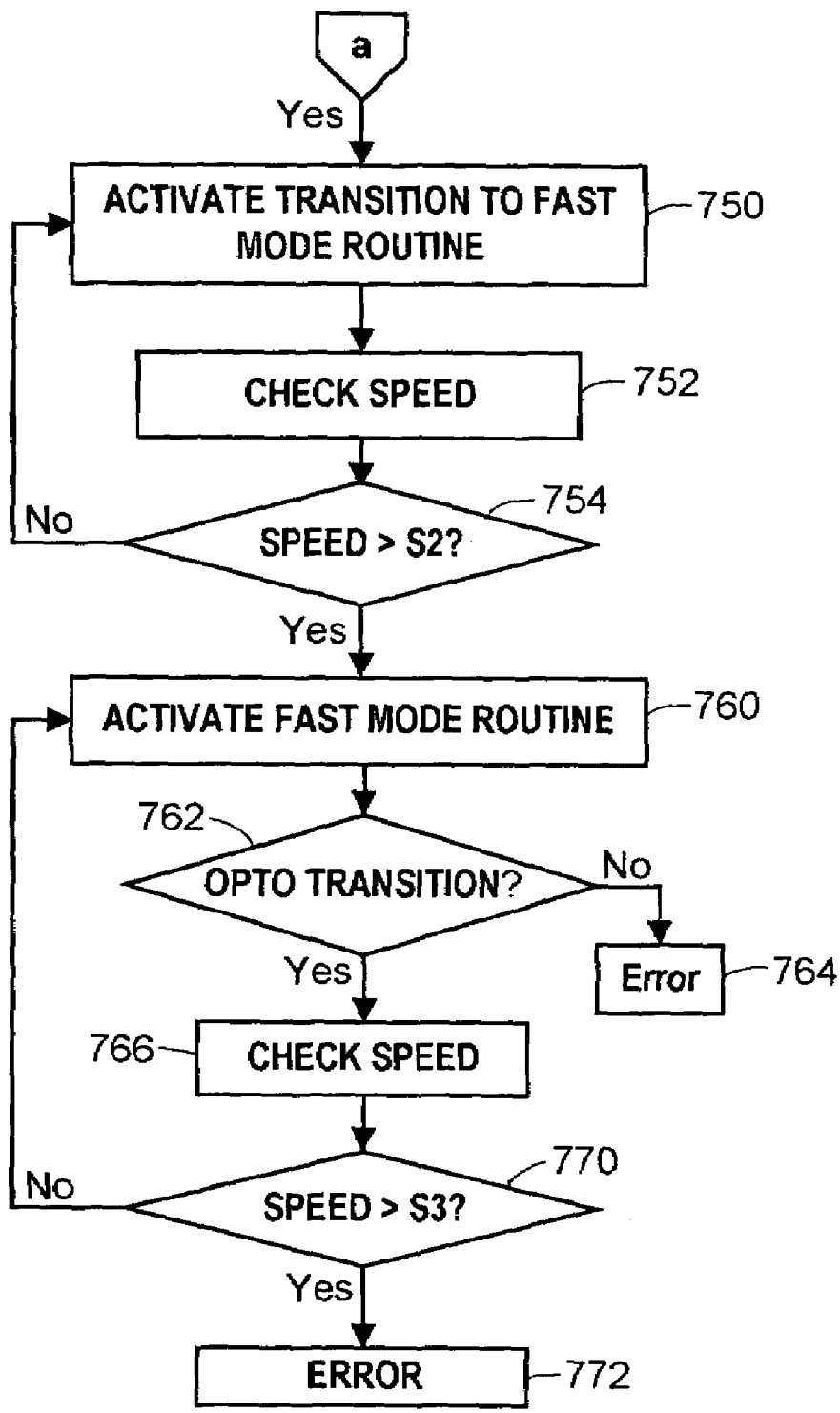

FIGS. 27A and 27B are two parts of a flowchart 700 describing some of the steps used to synchronize the switching or commutation of the power provided to the stator windings 32. Some, or all, of the steps shown of the flowchart 700 may be stored in the memory of the controller 512.

Referring to FIG. 27A, the flowchart 700 may begin when power is provided to the control circuit (block 702). This begins the initialization phase, and includes initializing the hardware, firmware, and start timers (block 704). Specifically, the initialization includes a series of inline initialization instructions that are executed every power on. The initialization may be further broken down into hardware initialization, variable initialization, and power on delay.

Upon power on, program execution begins within the controller 512 at a specific memory location. In essence, the hardware initialization includes a series of instructions that configure the controller 512 by assigning and configuring I/O, locating the processor stack, configuring the number of interrupts, and starting a plurality of period timers. The variable initialization includes installing sane default values to a number of variables, one of which is a speed dependant correction variable. Additionally, there is a 100 mS power on delay (block 706), which gives a number of power supply capacitors time to charge most of the way before the drivers are turned on. This prevents the IGBT drivers 514, 516 from dragging down the low voltage power supply during start up. During this time delay, the low side of the IGBT drivers are turned on to charge the bootstrap capacitors (block 710).

In operation, the controller 512 utilizes three different speed routines, namely slow mode, transition to fast mode, and fast mode. However, immediately after initialization, the controller 512 will determine a rotational speed of the rotor 16 by polling the opto-sensing assembly 508 in order to determine if the running re-start routine is needed before activating the slow mode (block 712). If it is determined at the block 714 that the rotor speed is greater than a predetermined value S1, such as for example, 6800 RPM, the routine 700 will jump to a running re-start mode which is utilized to prevent damage to the IGBT drivers after a rapid cycling of current provided to the motor 10. The rapid cycling of power to motor 10 is essentially a quick off/on while the motor 10 is already spinning. The running re-start routine is utilized to prevent damage to the IGBT drivers 514, 516, as cycling the power above certain speeds may confuse the slow mode routine (described below) and possibly blow one or more of the IGBTs 514, 516. The running re-start routine is used after a rapid cycling of power to initiate a delay that allows the rotational speed of the rotor to decrease to a point where the firing angles, as calculated by the controller 512, are fixed.

From a running re-start routine, if it is determined at the block 714 after power on that the speed is greater than 6800 RPM, a retry counter is set (block 716), for example. It should be noted that the retry counter may alternatively be set upon initialization, or may be set at another point in the running re-start routine. A predetermined time delay, such as 500 mS, may then be initiated (block 720). The rotational speed of the rotor 16 is than re-sampled (block 722). If it is determined at a block 724 that the rotational speed of the rotor 16 is still greater than the predetermined threshold S1, the routine will then check at a block 730 to determine the value of the retry counter.

If it is determined at the block 730 that the retry counter is not greater than 1, then an error maybe generated (block 732) and the system may be shut down. In other words, this would occur when the retry counter has counted down consecutively from 20 to 1. This would indicate that a predetermined time period would have passed. If it is determined at the block 730 that the retry counter is greater than 1, than the retry counter is decremented (block 734) and the routine returns to block 720 where another delay is initiated.

If it is determined that the block 724 at the rotational speed of the rotor 16 was less than the threshold S1, then the routine will jump to activate a slow mode routine (block 740). In other words, in the disclosed embodiment, the rotational speed of the rotor 16 continues to be re-sampled for a predetermined time if the re-sampled rotational speed continues to exceed the threshold S1. Those of ordinary skill in the art will readily appreciate that alternative methods of checking to ensure that the rotational speed of the rotor 16 has decreased to a safe level before jumping to the slow mode routine can be implemented. For example, a longer delay may be implemented in which the need to utilize the retry counter maybe eliminated. A variety of other techniques may also be utilized.

When the slow mode routine is activated at the block 740, the controller 512 provides Pulse Width Modulation (PWM) to which ever phase of stator windings 32 is ahead of the rotor poles 48 during start up to avoid large current spikes as the rotor 16 comes up to speed. The rotor position is typically known at startup from the state of the signal from the encoder/optical sensor 510. Effectively, each current pulse supplied to the stator windings 32 is chopped into many short (duration) current pulses until the rotor speed reaches a predetermined speed. At that point, full pulses are applied to the stator windings 32. The optical sensor transitions are polled, triple debounced, and disabled for a minimum period of time after a previous transition in order to reduce the chances of noise on the output signal. This technique is described in greater detail with reference to FIG. 32.

In slow mode, the current input is duty cycled to limit the maximum IGBT on time in all cases. Additionally, there are two unique commutation states that reflect the present state of the optical sensor.

Figure 28:
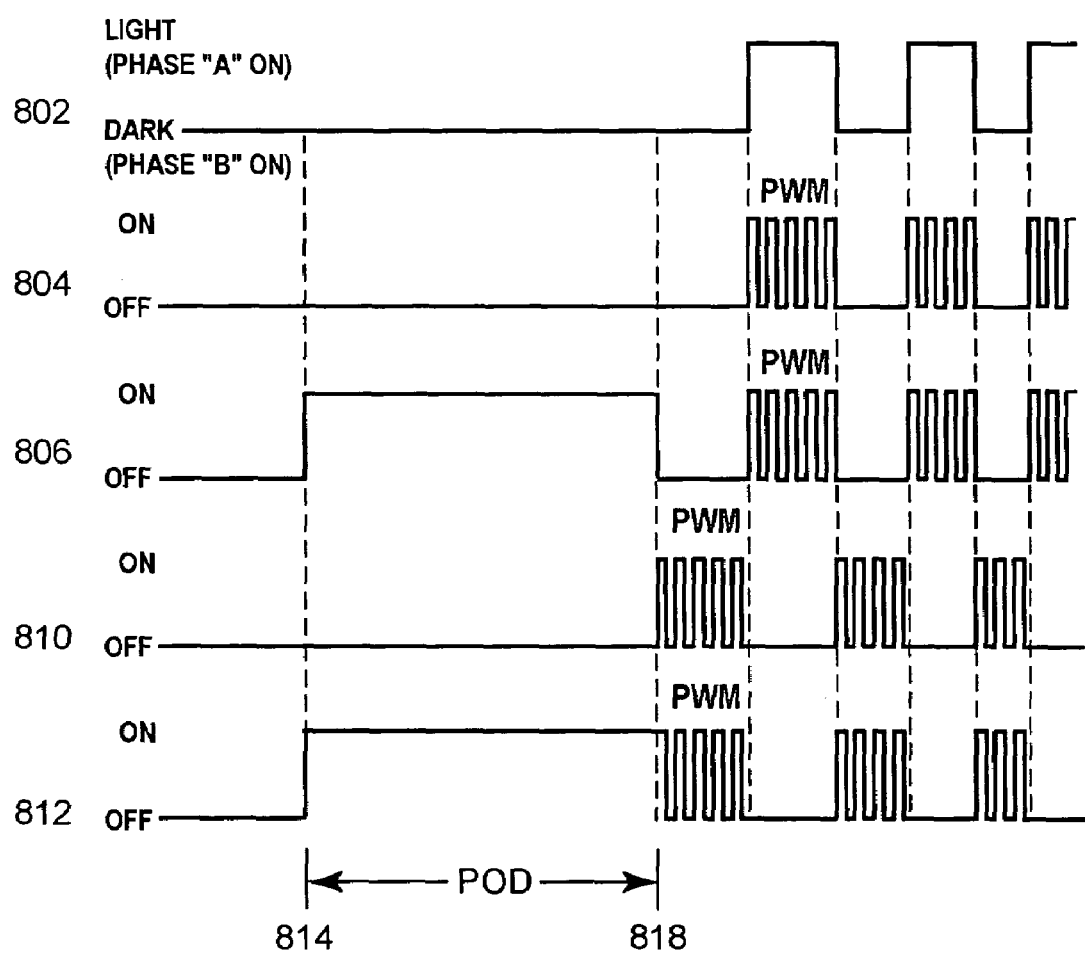
FIG. 28 illustrates a start-up wave form in a slow mode for the first 1.5 rotor revolutions for the switched reluctance motor.

FIG. 28 illustrates a start-up wave form in a slow mode for the first 1.5 rotor revolutions. The wave form 802 illustrates a signal received from the optical sensor 510. The wave form 804 illustrates the high side of phase 'A' and the wave form 806 illustrates the low side of phase 'A'. The wave form 810 illustrates the high side of phase 'B' and the wave form 812 illustrates the low side of phase 'B'. It is further illustrated that at the point 814, the power to the motor 10 is switched on. The predetermined power on delay described at block 706 in FIG. 27A is shown between times 814 and 818. As seen from the wave forms, at the point 814 when the power is switched on, the low side of both phase 'A' and phase 'B' are turned on to charge the bootstrap capacitors. It should be noted that only when both the low and the high side of a given phase are on is full current to the respective stator windings supplied.

Figure 29:
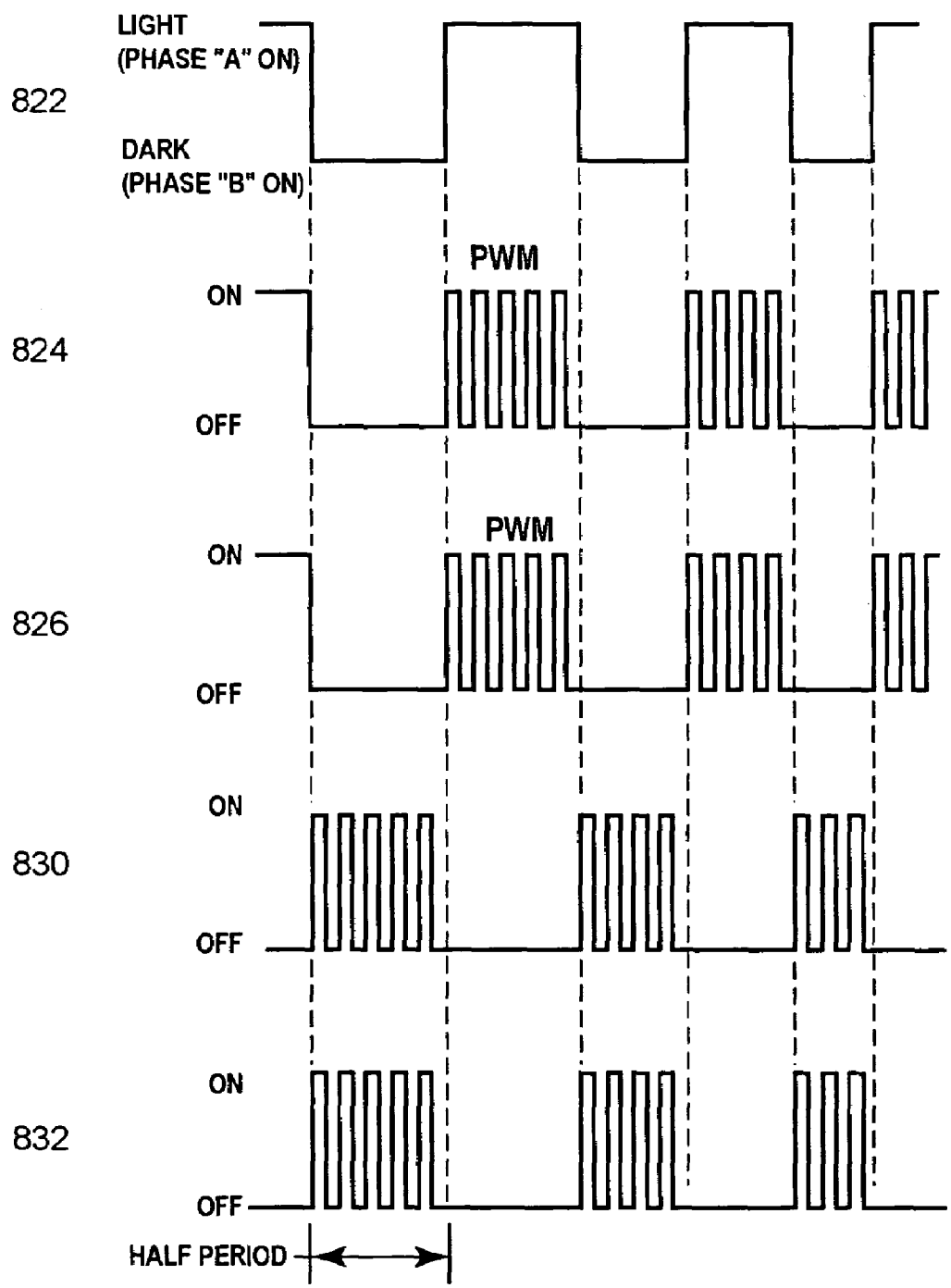
FIG. 29 also illustrates a number of wave forms in the slow mode routine.

FIG. 29 also illustrates a number of wave forms in the slow mode routine. Similar to FIG. 28, the wave form 822 illustrates the output from the opto-sensing assembly 508. The wave form 822 illustrates the high side of phase 'A' and the wave form 826 illustrates the low side of phase 'A'. The wave form 830 illustrates the high side of phase 'B', and the wave form 832 illustrates the low side of phase 'B'. FIG. 29 also illustrates that when power to a phase is on, it is actually a thirty-six percent duty Pulse Width Modulation signal. The modulating of both the high and low sides switches simultaneously is known as hard chopping. Soft chopping is the switching of one of the two sides. Hard chopping is used in the disclosed embodiment to minimize current burst at power up. It can also be seen from FIG. 29 that the period length of the wave forms decrease due to acceleration.

Returning to FIG. 27A, after initiating the slow mode routine at block 740, the routine will then check to see if an optical transition has occurred (block 742). If no optical transition has been recorded, then an error is generated indicating a problem on start up (block 744). If it is determined at block 742 that an optical transition has occurred, the routine may check the rotational speed of the rotor 16 (block 746). If it is determined at a block 748 that the rotational speed of the rotor 16 is less than the predetermined threshold S1, the routine returns to the block 740 to continue executing the slow mode routine. However, if it is determined that the block 748 that the rotational speed rotor 16 is greater than the predetermined threshold S1, the routine as shown on FIG. 27B will move to activate a transition to fast mode routine (block 750).

In the disclosed embodiment, the predetermined speed threshold S1 is approximately 7000 RPM. The transition to fast routine provides a speed transition from slow to fast by maintaining an identical phase on time as that of the slow mode, but switching in a way that includes pre-triggering of the phases. Acceleration continues due to the pre-triggering, but is tempered by the fixed on time, which is approximately 800 uS in the disclosed embodiment. The off time is variable depending on the speed. Because the rotor 16 is already accelerating due to the pre-triggering, the off time becomes shorter and shorter producing a higher duty cycle, which in turn increases the acceleration. The end result is a controlled runaway condition that modestly accelerates while minimizing, if not eliminating, current spikes and torque spikes.

After the transition to fast mode at block 750, the routine may then check the rotational speed of the rotor 16 (block 752). If it is determined at a block 754 that the rotational speed rotor 16 is less than a second predetermined speed threshold S2, the routine will return to the block 750 where the transition to fast mode routine continues. If it is determined at the block 754 that the rotational speed of the rotor 16 is greater than the predetermined speed threshold S2, the routine will activate the fast mode routine (block 760).

Figure 30:
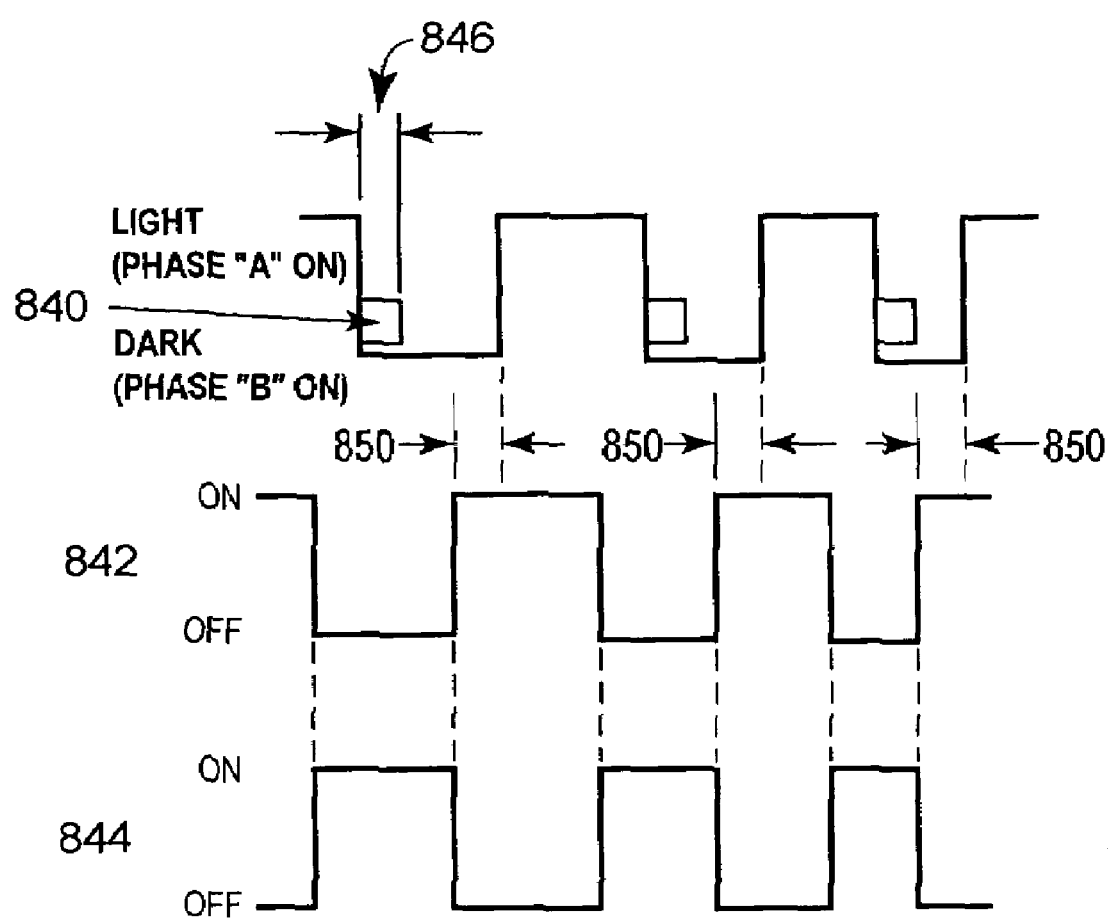
FIGS. 30 and 31 illustrate wave forms in the fast mode routine.
Figure 31:
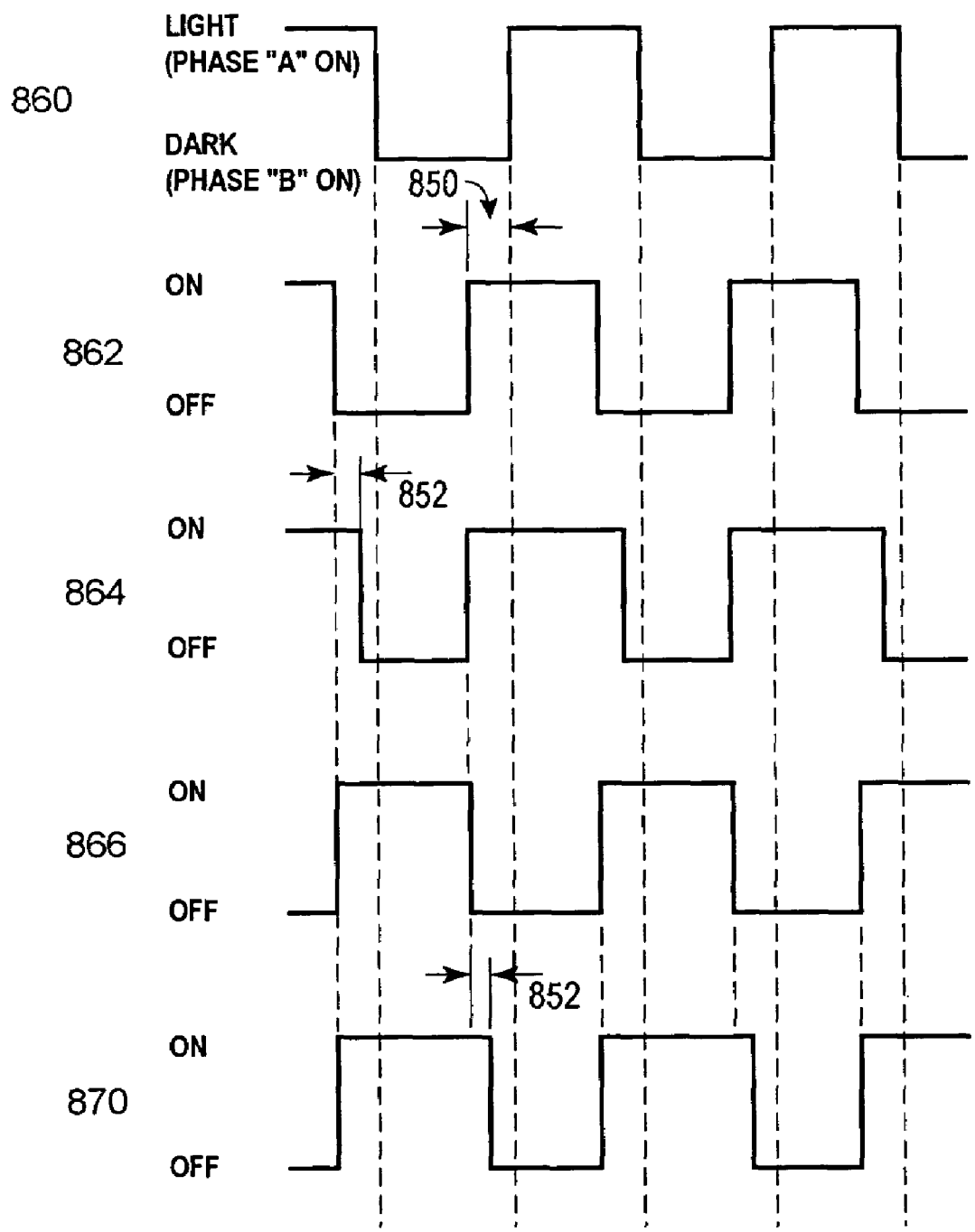

Wave forms illustrating the fast mode routine are shown in FIGS. 30 and 31. The fast mode routine is categorized by a pre-trigger algorithm to obtain maximum rotational speed. Pre-trigger values may be empirically derived to provide maximum RPM for a given maximum target current, such as 13.8 Amps at 120 VAC input, under various load and speed conditions. The pre-trigger algorithm in the fast mode may include a look up table that incorporates a correction for a three degree optical sensor disk advance that helps with start up.

The fundamental difference between the fast mode routine and the transition to fast mode is that the transition to fast mode limits the phase on time, which in the disclosed embodiment is approximately 800 uS. Whereas, in the fast mode, the phase on time is left on the entire cycle which may be up to approximately 830 uS. The switch to 100 percent duty causes a further acceleration surge which unchecked, may tend to runaway. There are however, two significant stabilizing influences. First, at high speeds it is difficult to pump and remove current through the stator windings 32, thereby limiting the transfer of power to the rotor 16. The winding charge time starts to become a significant fraction of the cycle. Second, the load increases with the cube of the rotor speed. This has a dramatic effect of tempering an otherwise runaway condition. Consequently, there is only a minor speed bump or surge when the fast mode is activated.

FIG. 30 illustrates wave forms corresponding to the pre-trigger discussed above. The wave form 840 illustrates the signal received from the opto-sensing assembly 508. The wave form 842 illustrates phase 'A' and form 844 illustrates phase 'B'. As further illustrated in FIG. 30, the interrupt 846 occurs on the falling edge of the optical sensor and lasts for approximately 200 to 300 uS. The time represented by 850 in FIG. 30 may be derived by a speed dependent look-up table (SDT) plus a pre-trigger value. This time period 850 also represents what may be referred to as a phase timing advance. The SDT optimizes the torque across the full range of load conditions within an application.

FIG. 31 illustrates a detailed look at the high side and the low side switch events within the fast mode. Similar to FIG. 29, the wave form 860 illustrates the signal received from the opto-sensing assembly 508. The wave form 862 illustrates the high side of phase 'A' and wave form 864 illustrates the low side of phase 'A'. The wave form 866 illustrates the high side of phase 'B' and wave form 870 illustrates the low side of phase 'B'. As in FIG. 30, time 850 represents the phase timing advance. Also illustrated in FIG. 31 is a time period 852 in which the low side switch is held on for the extra time to facilitate dumping from the stator winding the current generated by the magnetic collapse of the stator winding when the current is turned off. In the exemplary embodiment, the time period 852 is approximately 41 uS. As illustrated in FIG. 31, the low side's switch is held on for the extra time period 852 in both phase 'A' as well as phase 'B'.

In the context of microcontroller design, an interrupt is an asynchronous event that causes an immediate transfer of user program flow from its current execution loop to an interrupt service routine (ISR). The purpose of interrupts is to provide a quick, deterministic response to an external event without the need for constant polling in the main foreground program routine. An ISR is just like a normal subroutine of processing instructions with one exception. That is, because the ISR may be called or invoked at almost any time, independent of the current foreground execution loop, special care should be take to ensure it does not adversely affect the main program.

Period timers may be used in conjunction with an interrupt routine upon receipt of a falling edge of a signal from the opto-sensing assembly 508 as illustrated in FIG. 31. In the disclosed embodiment, the period timers are 8 bit countdown timers which counts down from 0 (256) to 1 and automatically reload. The resolution of the timers correspond to the crystal within the central processing unit 582 which is approximately a 10 MHz crystal. One of the period timers may be designated timer 1 (T1) which is an 8 bit countdown timer which counts down from % FF (255) to 1 and stops. T1 is initialized with a divide by 64 prescaler. Thus, its resolution is 51.2 uS. Table 1 illustrates the portion of the values for the period timers.

TABLE 1

| T1 | T0 | time (uS) | uS @ 8 MHZ REF |
|----|----|-----------|----------------|
| FF | 00 | 0 | |
| FF | FF | 0.8 | 1 |
| FF | FE | 1.6 | 2 |
| . | | | |
| . | | | |
| . | | | |
| FF | C1 | 50.4 | 63 |

TABLE 1-continued

| T1 | T0 | time (uS) | uS @ 8 MHZ REF |
|----|----|-----------|----------------|
| FE | C0 | 51.2 | 64 |
| FE | BF | 52 | 65 |
| . | | | |
| . | | | |
| . | | | |
| FC | 01 | 204 | 255 |
| FB | 00 | 204.8 | 256 |
| FB | FF | 205.6 | 257 |
| . | | | |
| . | | | |
| . | | | |

It should also be noted that the period timers count downward, not up. Additionally, the upper two bits of T0 contain redundant information. The two 8 bit values are merged or overlapped to produce a true 14 bit period. In order to calculate the period, it should be understood that "00" in T0 is equivalent to 256 and not 0. Thus, the maximum count is approximately 13,107 uS. There are a few microseconds that the timers are not running, and this time should be accounted for when calculating the period.

It is a common problem in control circuits for switched reluctance motors that noise is introduced into the electronic components. One place that noise is a particular problem is in the opto-sensing assembly 508. Noise is particularly undesirable here because it could be responsible for incorrectly triggering a commutation of power supplied to a phase winding. Because the noise is difficult to eliminate, it is necessary to ensure the accuracy and legitimacy of transition signals received from the opto-sensing assembly 508.

Figure 32:
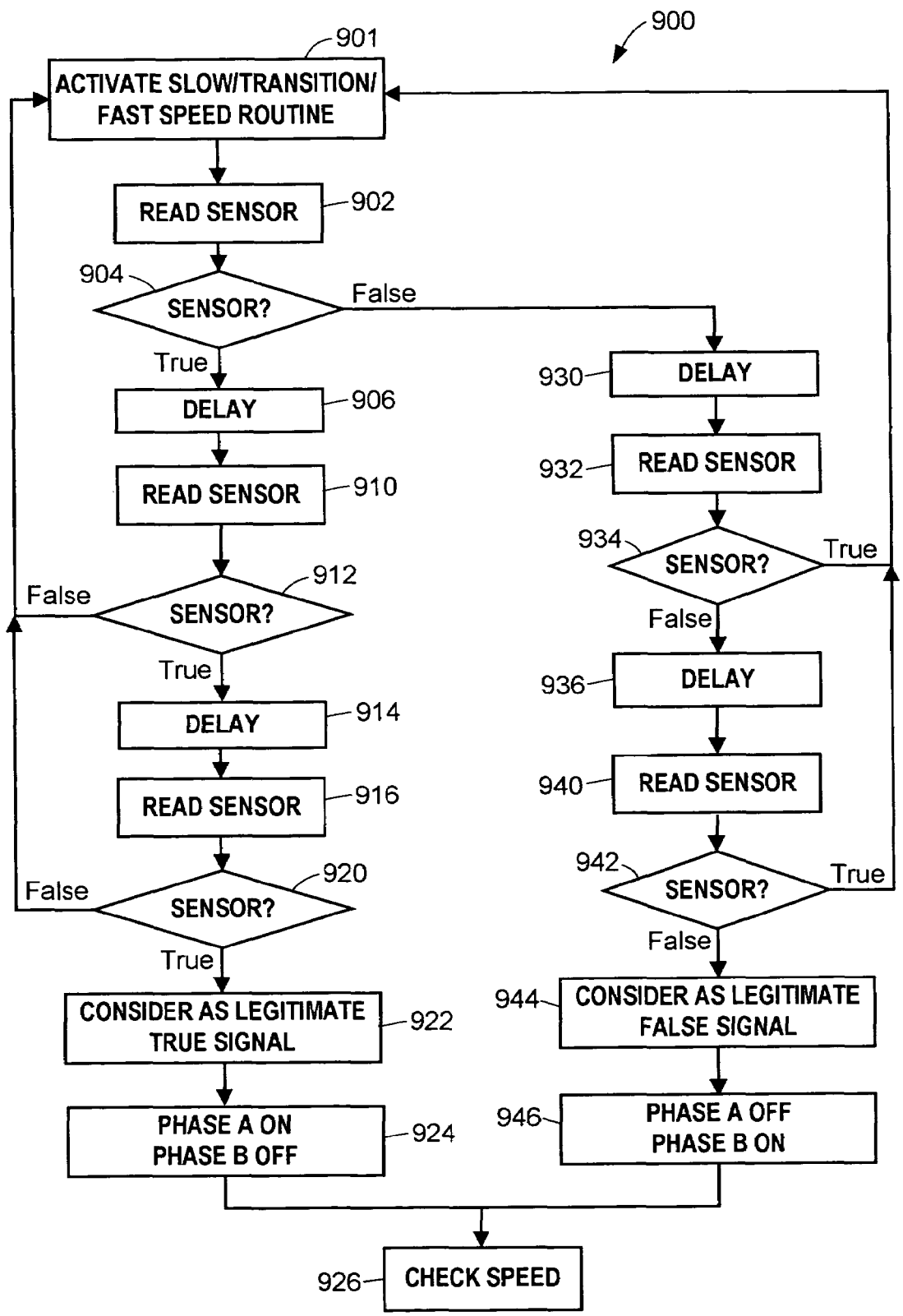
FIG. 32 illustrates some of the steps used to ensure the legitimacy of a signal received from a rotor position sensor in the switched reluctance motor.

FIG. 32 illustrates a flowchart 900 describing some of the steps used to ensure the legitimacy of a signal received from the rotor position sensor 510 in the motor 10. Some of the steps shown in the flowchart 900 may be stored in the memory 584 of the controller 512. The routine 900 may be used in any of the speed modes described above.

Referring to FIG. 32, after initializing the controller 512 and any other components within the commutation circuit, routine 900 may activate any one of the slow mode, transition to fast mode or fast modes (block 901). Routine 900 may then poll the rotor position sensor (block 902) in order to determinate a first state of the rotor position sensor. If it is determined at the block 904 that the state of the rotor position sensor 510 is true (i.e., light/clear) then a time delay may be initiated (block 906). The time delay may be achieved by retrieving one or more time constants from the memory 584. The one or more time constants each represent a different number of units, and each unit represents a predetermined time value. In the disclosed embodiment each time unit is approximately 25 uS. The time constants TD1–TD7 are illustrated in Table 2.

TABLE 2

TD1 is 20 units
TD2 is 32 units
TD3 is 28 units
TD4 is 1 unit
TD5 is 26 units
TD6 is 32 units
TD7 is 29 units Referring again to FIG. 32, after the delay initiated at the block 906, the routine 900 polls the rotor position sensor or opto-sensing assembly 508 (block 910). If it is determined at the block 912 that the rotor position sensor 508 is false, the routine will return back to the speed routine that is currently operating at block 901. If it is determined at the block 912 that the state of the rotor position 512 was true, another delay may be initiated (block 914). Thereafter, the routine may poll the rotor position sensor 508 (block 916). If it is determined at the block 920 that the third state of the rotor position sensor is false, the routine returns to the block 900 and to the active speed routine.

If however, it is determined at the block 920 that the third state of the rotor position sensor 920 is true, then the routine will consider the true state of the rotor position sensor as a legitimate true signal (block 922). The routine will then cause phase 'A' to be on and phase 'B' to be off (block 924). Thereafter, the active speed routine will continue and may check the rotational speed of the rotor 16 (block 926). It should also be noted that all optical changes that occur during the time TD1+TD2+TD3 after a previously debounced transition is recognized are ignored. This gives the optical sensor 508 time to fully change states before another transition is recognized. And all transitions that are ultimately recognized are triple debounced. A consequence of this aggressive debouncing algorithm limits the power on re-start speed, which is corrected by the previously discussed running re-start algorithm.

If it is determined at the block 904 that the first state of the rotor position sensor is false, a delay may be initiated (block 930) before the optical sensor is re-polled (block 932). If it is determined at a block 934 that the state of the rotor position sensor after the first delay is true, the flowchart 900 will return to which ever speed routine is active at block 901. If it is determined at the block 934 that the state of the rotor position sensor is false, the routine will initiate a second delay (block 936). The rotor position sensor 508 is then polled for a third time (block 940). If it is determined that the third state of the rotor position sensor is true, the routine will return to the active speed routine at block 901.

If however, it is determined that third state of the rotor position sensor is false, the routine will consider the false state of the rotor position sensor as a legitimate false signal (block 944). Phase 'A' of the stator windings 32 will then be turned off, and phase 'B' of the stator windings 32 will be turned on (block 946). The active speed routine will then proceed and may check the rotational speed of the rotor 16 (block 926).

Figure 33:
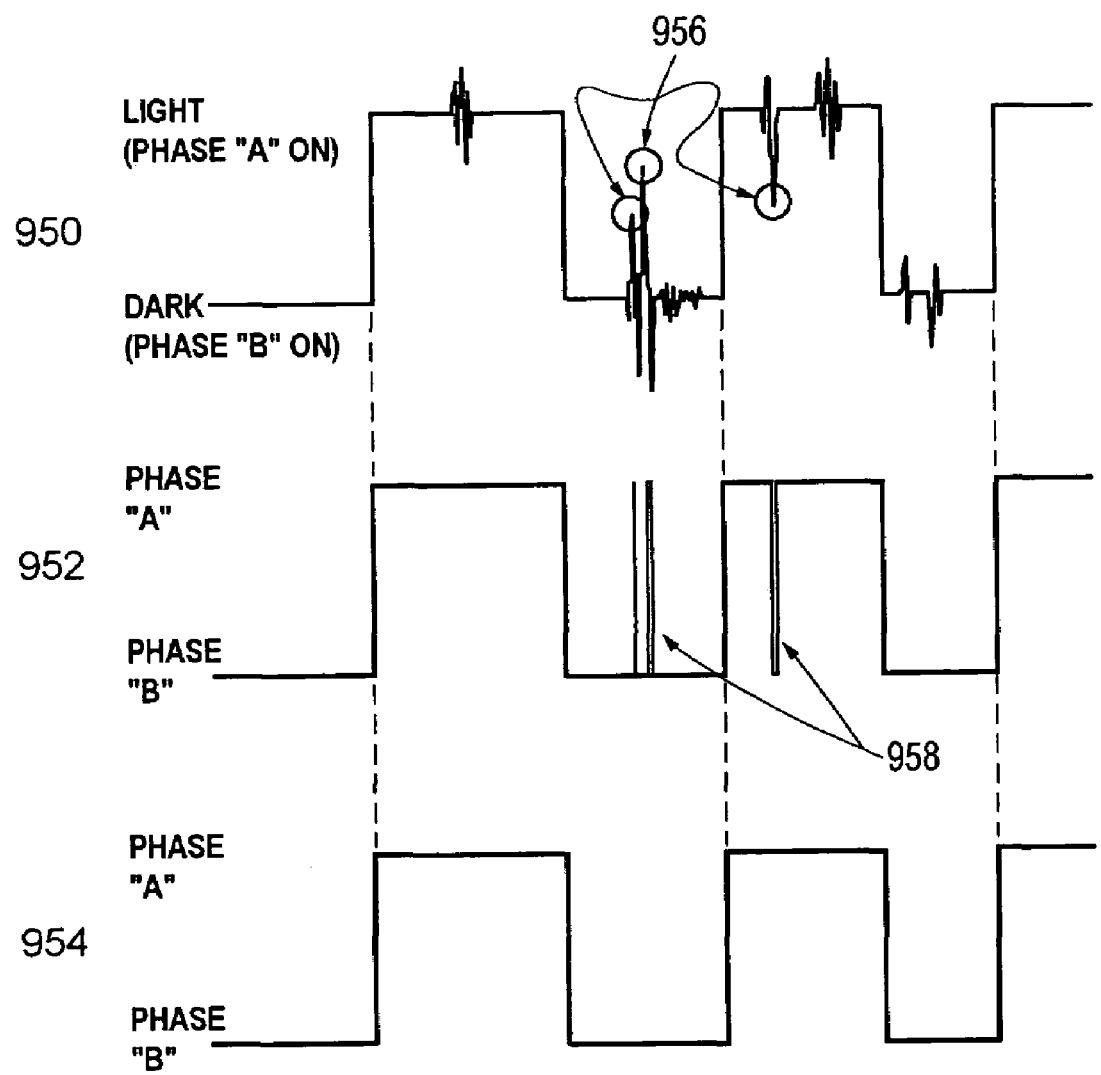
FIG. 33 illustrates three wave forms received from the rotor position sensor in the switched reluctance motor.

FIG. 33 illustrates three wave forms received from the rotor position sensor 508. Wave form 950 illustrates spurious electrical noise spikes on the opto circuit. Wave form 952 illustrates the phase signal of phase 'A' and phase 'B' without the debounce routine. Wave form 954 illustrates the phase signal of phase 'A' and phase 'B' with the debounce routine.

As illustrated in the wave form 950, the controller 512 records a number of noise peaks 956. In wave form 952, a number of undesired triggerings of the phases is illustrated at 958. This occurs because a debounce routine was not activated or was not utilized in association with this phase signal. In contrast, wave form 954 illustrates a clean phase signal which has not been impacted by the noise on the opto circuit from wave from of 950 as a result of the debounce routine as described in FIG. 32.

The debounce routine 900 shown in FIG. 32 helps to ensure that any sensory events do not include any spurious electrical noise spikes that have been imposed upon the sensor circuitry. A noise spike is typically much shorter in length than a full period of three sensor reads, thus eliminating noise being read on more than just one read event. As the flowchart 900 illustrates, three consecutive TRUE reads or three FALSE reads must be sensed before the controller 512 considers the reads status legitimate.

Although the forgoing text sets forth a detailed description of numerous different embodiments of the invention, it should be understood that the scope of the invention is defined by the words of the claims set forth at the end of this patent. The detailed description is to be construed as exemplary only and does not describe every possible embodiment of the invention because describing every possible embodiment would be impractical, if not impossible. Numerous alternative embodiments could be implemented, using either current technology or technology developed after the filing date of this patent, which would still fall within the scope of the claims defining the invention.

Thus, many modifications and variations may be made in the techniques and structures described and illustrated herein without departing from the spirit and scope of the present invention. Accordingly, it should be understood that the methods and apparatus described herein are illustrative only and are not limiting upon the scope of the invention.

What is claimed is:

1. A switched reluctance machine comprising:
    a stator body having a stator pole;
    a bobbin located on the stator pole;
    a stator winding disposed on the bobbin;
    a first housing unit for receiving the stator body;
    an insulating member coupled to the first housing unit, the insulating member comprising a first mounting element for engaging a first end of the bobbin to secure the bobbin against displacement during machine operation;
    a second housing unit comprising a second mounting element for engaging a second end of the bobbin to secure the bobbin against displacement during machine operation; and
    a wire retainer located at the second end of the bobbin, wherein the wire retainer matingly engages the second mounting element located in the second housing unit during assembly.

2. The machine of claim 1, further comprising a wire lead disposed in the second mounting element.

3. The machine of claim 1, wherein the wire retainer comprises two prongs located at opposing ends of the second end of the bobbin, each of the prongs including a groove for receiving an end of the stator winding disposed on the bobbin.

4. The machine of claim 1, wherein each of the prongs comprises an outer portion and an inner portion disposed within the outer portion.

5. The machine of claim 4, wherein the outer portion is composed of a nonconductive material, and wherein the inner portion is composed of a conductive material to provide an electrical connection between the stator winding disposed on the bobbin and the wire lead disposed in the second mounting element.

6. The machine of claim 1, wherein the stator pole comprises four stator poles.

7. The machine of claim 1, wherein the stator pole and the stator body are formed as one, integral piece.

8. The machine of claim 7, wherein the one, integral piece is formed as a plurality of stacked laminations.

9. The machine of claim 1, wherein the insulating member is formed of a non-conductive material.

10. A switched reluctance machine comprising:
    a stator body having a stator pole;
    a bobbin located on the stator pole;
    a stator winding disposed on the bobbin;
    a first housing unit for receiving the stator body, the first housing unit comprising a first mounting element for engaging a first end of the bobbin to secure the bobbin against displacement during machine operation;
    a second housing unit comprising a second mounting element for engaging a second end of the bobbin to secure the bobbin against displacement during machine operation; and
    a wire retainer located at the second end of the bobbin, wherein the wire retainer matingly engages the second mounting element located in the second housing unit during assembly.

11. The machine of claim 10, further comprising a wire lead disposed in the second mounting element.

12. The machine of claim 10, wherein the wire retainer comprises two prongs located at opposing ends of the second end of the bobbin, each of the prongs including a groove for receiving an end of the stator winding disposed on the bobbin.

13. The machine of claim 10, wherein each of the prongs comprises an outer portion and an inner portion disposed within the outer portion.

14. The machine of claim 13, wherein the outer portion is composed of a nonconductive material, and wherein the inner portion is composed of a conductive material to provide an electrical connection between the stator winding disposed on the bobbin and the wire lead disposed in the second mounting element.

15. The machine of claim 10, wherein the stator pole comprises four stator poles.

16. The machine of claim 10, wherein the stator pole and the stator body are formed as one, integral piece.

17. The machine of claim 16, wherein the one, integral piece is formed as a plurality of stacked laminations.

18. A switched reluctance machine system comprising:
    a vacuum cleaner; and
    a switched reluctance machine comprising:
    a stator body having a stator pole;
    a bobbin located on the stator pole;
    a stator winding disposed on the bobbin;
    a first housing unit for receiving the stator body;
    an insulating member coupled to the first housing unit, the insulating member comprising a first mounting element for engaging a first end of the bobbin to secure the bobbin against displacement during machine operation;
    a second housing unit comprising a second mounting element for engaging a second end of the bobbin to secure the bobbin against displacement during machine operation; and
    a wire retainer located at the second end of the bobbin, wherein the wire retainer comprises two prongs located at opposing ends of the second end of the bobbin, each of the prongs including a groove for receiving an end of the stator winding disposed on the bobbin.

19. The system of claim 18, further comprising a wire lead disposed in the second mounting element.

20. The system of claim 18, wherein the wire retainer matingly engages the second mounting element located in the second housing unit during assembly.

21. The system of claim 18, wherein each of the prongs comprises an outer portion and an inner portion disposed within the outer portion.

22. The system of claim 21, wherein the outer portion is composed of a nonconductive material, and wherein the inner portion is composed of a conductive material to provide an electrical connection between the stator winding disposed on the bobbin and the wire lead disposed in the second mounting element.

23. The system of claim 18, wherein the stator pole comprises four stator poles.

24. The system of claim 18, wherein the stator pole and the stator body are formed as one, integral piece.

25. The system of claim 24, wherein the one, integral piece is formed as a plurality of stacked laminations.

26. A switched reluctance machine comprising:
a stator body having a stator pole;
a bobbin located on the stator pole;
a stator winding disposed on the bobbin;
a first housing unit for receiving the stator body;
an insulating member coupled to the first housing unit, the insulating member comprising a first mounting element for engaging a first end of the bobbin to secure the bobbin against displacement during machine operation; and
a second housing unit comprising a second mounting element for engaging a second end of the bobbin, wherein the second end of the bobbin includes structure which matingly engages the second mounting element during assembly to secure the bobbin against displacement during machine operation.

27. The machine of claim 26, further comprising a wire lead disposed in the second mounting element.

28. The machine of claim 27, wherein the structure includes a wire retainer.

29. The machine of claim 28, wherein the wire retainer comprises two prongs located at opposing ends of the second end of the bobbin, each of the prongs including a groove for receiving an end of the stator winding disposed on the bobbin.

30. The machine of claim 28, wherein the wire retainer matingly engages the wire lead disposed in the second mounting element located in the second housing unit during assembly.

31. The machine of claim 28, wherein each of the prongs comprises an outer portion and an inner portion disposed within the outer portion.

32. The machine of claim 31, wherein the outer portion is composed of a nonconductive material, and wherein the inner portion is composed of a conductive material to provide an electrical connection between the stator winding disposed on the bobbin and the wire lead disposed in the second mounting element.

33. The machine of claim 26, wherein the stator pole comprises four stator poles.

34. The machine of claim 26, wherein the stator pole and the stator body are formed as one, integral piece.

35. The machine of claim 34, wherein the one, integral piece is formed as a plurality of stacked laminations.

36. The machine of claim 26, wherein the insulating member is formed of a non-conductive material.

37. A switched reluctance machine comprising:
a stator body having a stator pole;
a bobbin located on the stator pole;
a stator winding disposed on the bobbin;
a first housing unit for receiving the stator body, the first housing unit comprising a first mounting element for engaging a first end of the bobbin to secure the bobbin against displacement during machine operation; and
a second housing unit comprising a second mounting element for engaging a second end of the bobbin, wherein the second end of the bobbin includes structure which matingly engages the second mounting element during assembly to secure the bobbin against displacement during machine operation.

38. The machine of claim 37, further comprising a wire lead disposed in the second mounting element.

39. The machine of claim 38, wherein the structure includes a wire retainer.

40. The machine of claim 39, wherein the wire retainer comprises two prongs located at opposing ends of the second end of the bobbin, each of the prongs including a groove for receiving an end of the stator winding disposed on the bobbin.

41. The machine of claim 39, wherein the wire retainer matingly engages the wire lead disposed in the second mounting element located in the second housing unit during assembly.

42. The machine of claim 39, wherein each of the prongs comprises an outer portion and an inner portion disposed within the outer portion.

43. The machine of claim 42, wherein the outer portion is composed of a nonconductive material, and wherein the inner portion is composed of a conductive material to provide an electrical connection between the stator winding disposed on the bobbin and the wire lead disposed in the second mounting element.

44. The machine of claim 37, wherein the stator pole comprises four stator poles.

45. The machine of claim 37, wherein the stator pole and the stator body are formed as one, integral piece.

46. The machine of claim 45, wherein the one, integral piece is formed as a plurality of stacked laminations.

47. A switched reluctance machine system comprising:
a vacuum cleaner; and
a switched reluctance machine comprising:
a stator body having a stator pole;
a bobbin located on the stator pole;
a stator winding disposed on the bobbin;
a first housing unit for receiving the stator body;
an insulating member coupled to the first housing unit, the insulating member comprising a first mounting element for engaging a first end of the bobbin to secure the bobbin against displacement during machine operation; and
a second housing unit comprising a second mounting element for engaging a second end of the bobbin, wherein the second end of the bobbin includes a structure which matingly engages the second mounting element during assembly to secure the bobbin against displacement during machine operation.

48. The system of claim 47, further comprising a wire lead disposed in the second mounting element.

49. The system of claim 47, wherein the structure includes a wire retainer.

50. The system of claim 49, wherein the wire retainer comprises two prongs located at opposing ends of the second end of the bobbin, each of the prongs including a groove for receiving an end of the stator winding disposed on the bobbin.

51. The system of claim 49, wherein the wire retainer matingly engages the second mounting element located in the second housing unit during assembly.

52. The system of claim 49, wherein each of the prongs comprises an outer portion and an inner portion disposed within the outer portion.

53. The system of claim 52, wherein the outer portion is composed of a nonconductive material, and wherein the inner portion is composed of a conductive material to provide an electrical connection between the stator winding disposed on the bobbin and the wire lead disposed in the second mounting element.

54. The system of claim 47, wherein the stator pole comprises four stator poles.

55. The system of claim 47, wherein the stator pole and the stator body are formed as one, integral piece.

56. The system of claim 55, wherein the one, integral piece is formed as a plurality of stacked laminations.

* * * * *